United States Patent
Vadlamudi et al.

(10) Patent No.: US 9,198,180 B2
(45) Date of Patent: Nov. 24, 2015

(54) OPPORTUNISTIC RECEIVE DIVERSITY FOR MULTI-SUBSCRIBER SCENARIO

(71) Applicant: QUALCOMM Incorporated, San Diego, CA (US)

(72) Inventors: Venkata Girish Vadlamudi, Hyderabad (IN); Venkata Siva Prasad Rao Gude, San Diego, CA (US); Debesh Kumar Sahu, Hyderabad (IN); Zhi-Zhong Yu, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/204,915

(22) Filed: Mar. 11, 2014

(65) Prior Publication Data

US 2015/0264681 A1    Sep. 17, 2015

(51) Int. Cl.
*H04W 72/00* (2009.01)
*H04W 72/04* (2009.01)
*H04W 72/12* (2009.01)

(52) U.S. Cl.
CPC ........ *H04W 72/0446* (2013.01); *H04W 72/048* (2013.01); *H04W 72/1205* (2013.01)

(58) Field of Classification Search
CPC .............. H04W 72/08; H04W 72/048; H04W 72/0446; H04W 72/1205; H04W 28/0236; H04W 28/0242
USPC ............. 455/450, 452.1, 452.2; 370/329, 341
See application file for complete search history.

(56) References Cited

U.S. PATENT DOCUMENTS

| | | |
|---|---|---|
| 2011/0205947 A1 | 8/2011 | Xin et al. |
| 2011/0217969 A1 | 9/2011 | Spartz et al. |
| 2012/0182913 A1 | 7/2012 | Kreuzer |
| 2013/0150111 A1* | 6/2013 | Su et al. ............ 455/515 |
| 2013/0163443 A1* | 6/2013 | Liberg et al. .......... 370/252 |
| 2013/0189985 A1 | 7/2013 | Mutya et al. |
| 2013/0303181 A1 | 11/2013 | Rajurkar et al. |

FOREIGN PATENT DOCUMENTS

| | | | | |
|---|---|---|---|---|
| EP | 2 498 567 | * | 9/2012 | ............ H04W 88/00 |
| WO | WO-2013007869 A1 | | 1/2013 | |

OTHER PUBLICATIONS

International Search Report and Written Opinion—PCT/US2015/019292—ISA/EPO—Jun. 11, 2015.

* cited by examiner

*Primary Examiner* — Wayne Cai
(74) *Attorney, Agent, or Firm* — Loza & Loza LLP

(57) ABSTRACT

An opportunistic receive diversity scheme for VAMOS and similar deployments is disclosed. Receive diversity may be conditionally enabled when a VAMOS call is assigned to one of the SIMs of a mobile device. For example, receive diversity may be enabled when VAMOS data does not overlap with a time slot that is used by another subscription of the mobile device for receiving page messages. Also, receive diversity for a VAMOS call may be limited to situations where the VAMOS channel conditions are poor. Receive diversity may be enabled in cases where multiple subscriptions are assigned the same VAMOS channel, where VAMOS channel conditions have deteriorated, or where one of the subscriptions is not on a VAMOS channel. Also, receive diversity may be dynamically enabled for multiple subscriptions in cases where the subscriptions are assigned to different VAMOS channels.

30 Claims, 17 Drawing Sheets

OPPORTUNISTIC RECEIVE DIVERSITY FOR MULTI-SUBSCRIBER SCENARIO

BACKGROUND

1. Field

Aspects of the disclosure relate generally to wireless communication and more particularly, but not specifically, to opportunistic receive diversity.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is a global system for mobile communications (GSM) network. Enhanced general packet radio service (EGPRS) is an extension of GSM technology providing increased data rates beyond those available in second-generation GSM technology. EGPRS is also known as Enhanced Data rates for GSM Evolution (EDGE).

In conventional GSM wireless communication technology, different users are multiplexed by using time division multiple access (TDMA), where within one frequency channel each user is allocated resources according to a time schedule, dividing up resources among users using one time slot per user. VAMOS (Voice services over Adaptive Multi-user channels on One Slot) is an enhancement that enables doubling of the standard network capacity for voice calls. Specifically, in VAMOS, different training sequence codes are used to enable a base station to multiplex (or pair) two users onto the same resource (i.e., the same frequency and the same time slot). In addition, to facilitate sharing of the resource, lower transmit power may be allocated to each user as compared to conventional GSM.

Generally, a mobile device (e.g., a mobile station (MS), a user equipment (UE), etc.) configured for GSM uses a SIM or USIM card (subscriber identity module or universal subscriber identity module) to store the subscriber's identity and for other security and authentication purposes. Some mobile devices have multi-SIM capability, and accordingly, multiple subscriptions for wireless service. Moreover, these mobile devices may have two or more radio frequency (RF) chains (receive and/or transmit). Such devices may be referred to as dual-SIM, multi-SIM, dual-SIM dual-standby (DSDS), dual-SIM dual active (DSDA), tri-SIM dual active (TSDA), and so on. For some deployments, a mobile device vendor may compromise the RF quality of a mobile device to reduce costs. For example, a low cost mobile device may include a less sensitive RF receive chain.

The use of a low sensitivity receive chain may cause performance issues in mobile devices that use VAMOS. If two or more mobile devices share same VAMOS channel, the signals from the mobile devices will interfere on the VAMOS channel. For example, when the subchannel power imbalance ratio (SCPIR) is 0 dB, a VAMOS channel may experience 3 dB less power (as compared to conventional GSM) due to peak to average effect in the VAMOS channel. Thus, there is a need for improved performance in mobile devices that support VAMOS.

SUMMARY

The following presents a simplified summary of some aspects of the disclosure in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

Various aspects of the disclosure provide for "opportunistic" receive diversity (RxD) for a VAMOS deployment. Receive diversity relates to the use of two or more antennas or receivers to receive an incoming signal, where the antennas/receivers are spatially separated from one another (e.g., on opposite sides of the mobile device). With receive diversity, improved sensitivity or receive performance can be achieved.

Various aspects of the disclosure provide for using receive diversity in a multi-SIM mobile device that has at least one subscription capable of using VAMOS and has a VAMOS slot assigned to that subscription. In this way, better sensitivity can be achieved on the VAMOS channel. Moreover, receive diversity may be selectively disabled for the GSM subscription in the event VAMOS is not active. Thus, any unnecessary increase in power consumption that could otherwise result from the use of receive diversity may be avoided. Receive diversity also may be selectively disabled in the event another subscription of the mobile device needs to use the receive diversity antenna/receiver.

Various aspects of the disclosure provide for receive diversity in a DSDS mobile device. Receive diversity may be conditionally enabled when a VAMOS call is assigned to one of the SIMs of the mobile device. For example, receive diversity may be enabled when VAMOS data does not overlap with a time slot that is used by another subscription of the mobile device for receiving page messages. That is, the receive diversity antenna/receiver might not be made available to the VAMOS call if use of the receive diversity antenna/receiver by the VAMOS call would interfere with the use of the receive diversity antenna/receiver by another subscription. As another example, the assignment of receive diversity to a VAMOS call may be limited to situations where the VAMOS channel conditions are poor.

Various aspects of the disclosure provide for conditionally enabling receive diversity in a DSDA or TSDA mobile device. For example, receive diversity may be enabled in cases where both subscriptions are assigned the same VAMOS channel, where VAMOS channel conditions have deteriorated, or where one of the subscriptions is not on a VAMOS channel. Also, receive diversity may be dynamically enabled for multiple subscriptions in cases where the subscriptions are assigned to different VAMOS channels.

In one aspect, the disclosure provides a method for wireless communication including allocating a first radio frequency (RF) chain to a call associated with a first subscription of an access terminal; determining whether the call is assigned to an RF channel and timeslot that are assigned to more than one call; identifying an operational condition associated with a second subscription of the access terminal; and determining whether to allocate a diversity RF chain to the call in addition to the first RF chain, wherein the determination of whether to allocate the diversity RF chain is based on the determination of the call assignment and the identified operational condition.

Another aspect of the disclosure provides an apparatus configured for wireless communication that includes at least one processing circuit, a memory coupled to the at least one processing circuit, and a communication interface coupled to the at least one processing circuit. The at least one processing circuit is configured to allocate a first RF chain to a call associated with a first subscription of the apparatus; determine whether the call is assigned to an RF channel and timeslot that are assigned to more than one call; identify an operational condition associated with a second subscription of the access terminal; and determine whether to allocate a diversity RF chain to the call in addition to the first RF chain, wherein the determination of whether to allocate the diversity RF chain is based on the determination of the call assignment and the identified operational condition.

Another aspect of the disclosure provides an apparatus configured for wireless communication. The apparatus including means for allocating a first RF chain to a call associated with a first subscription of the apparatus; means for determining whether the call is assigned to an RF channel and timeslot that are assigned to more than one call; means for identifying an operational condition associated with a second subscription of the apparatus; and means for determining whether to allocate a diversity RF chain to the call in addition to the first RF chain, wherein the determination of whether to allocate the diversity RF chain is based on the determination of the call assignment and the identified operational condition.

Another aspect of the disclosure provides an article of manufacture including a computer-readable medium having programming for causing a computer to allocate a first RF chain to a call associated with a first subscription of an access terminal; determine whether the call is assigned to an RF channel and timeslot that are assigned to more than one call; identify an operational condition associated with a second subscription of the access terminal; and determine whether to allocate a diversity RF chain to the call in addition to the first RF chain, wherein the determination of whether to allocate the diversity RF chain is based on the determination of the call assignment and the identified operational condition.

These and other aspects of the disclosure will become more fully understood upon a review of the detailed description, which follows. Other aspects, features, and implementations of the disclosure will become apparent to those of ordinary skill in the art, upon reviewing the following description of specific, implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
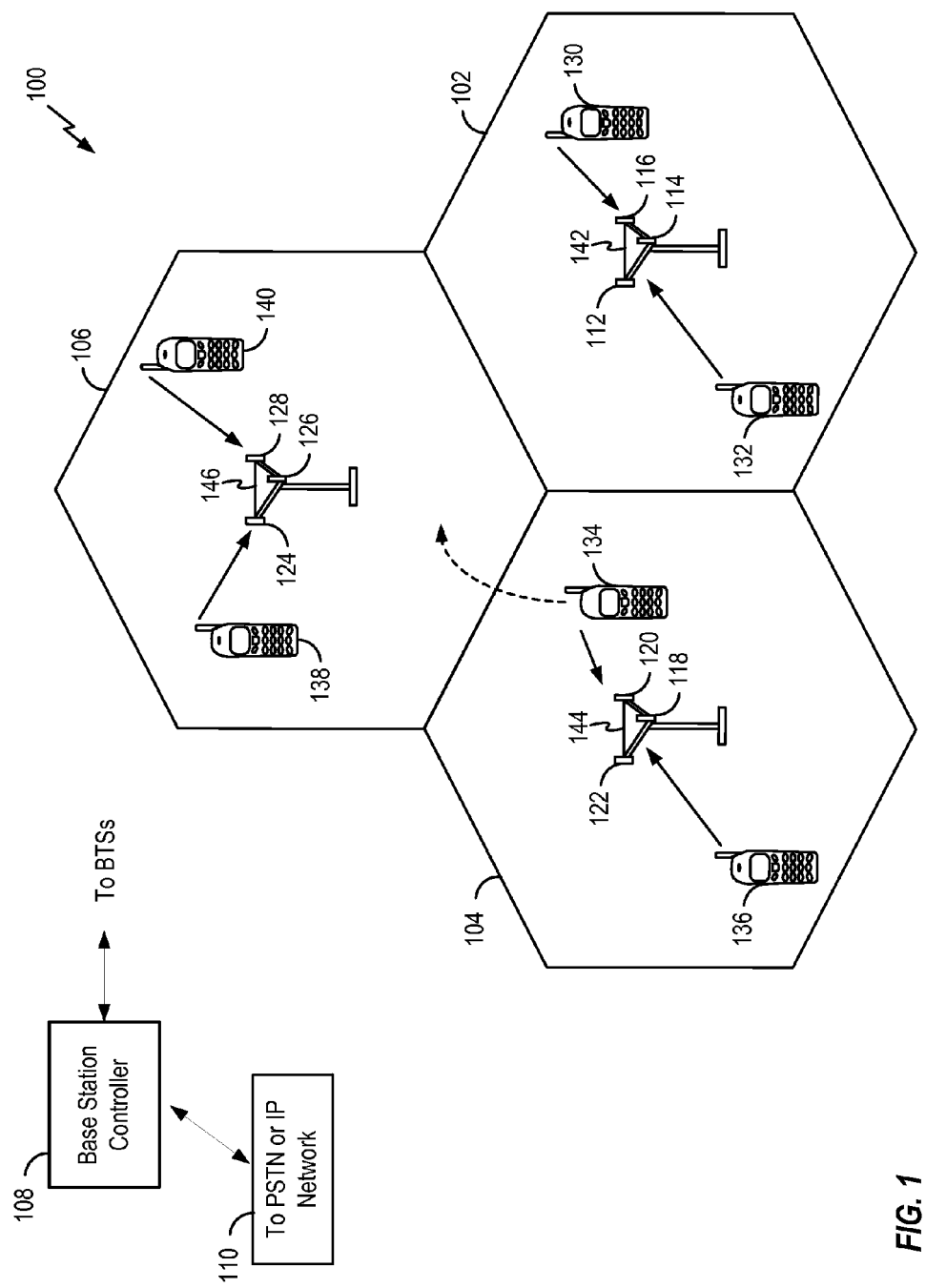
FIG. 1 is a conceptual diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, a simplified access network 100 in a GSM/EDGE architecture is illustrated. A GSM EDGE radio access network (GERAN) is one example of a RAN that may be utilized in accordance with the disclosure.

The network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 may each correspond to a different sector. In cell 106, antenna groups 124, 126, and 128 may each correspond to a different sector.

The cells 102, 104, and 106 may include several UEs that may be in communication with one or more sectors of each cell 102, 104, or 106. For example, UEs 130 and 132 may be in communication with a base transceiver station (BTS) 142, UEs 134 and 136 may be in communication with a BTS 144, and UEs 138 and 140 may be in communication with a BTS 146.

The network 100 includes one or more base station controllers (BSC) 108 and a core network 110 providing access to a public switched telephone network (PSTN) (e.g., via a mobile switching center/visitor location register (MSC/VLR)) and/or to an IP network (e.g., via a packet data switching node (PDSN)). Here, each BTS 142, 144, and 146 may be configured to provide an access point to the core network 110 for all the UEs 130, 132, 134, 136, 138, and 140 in the respective cells 102, 104, and 106.

Figure 2:
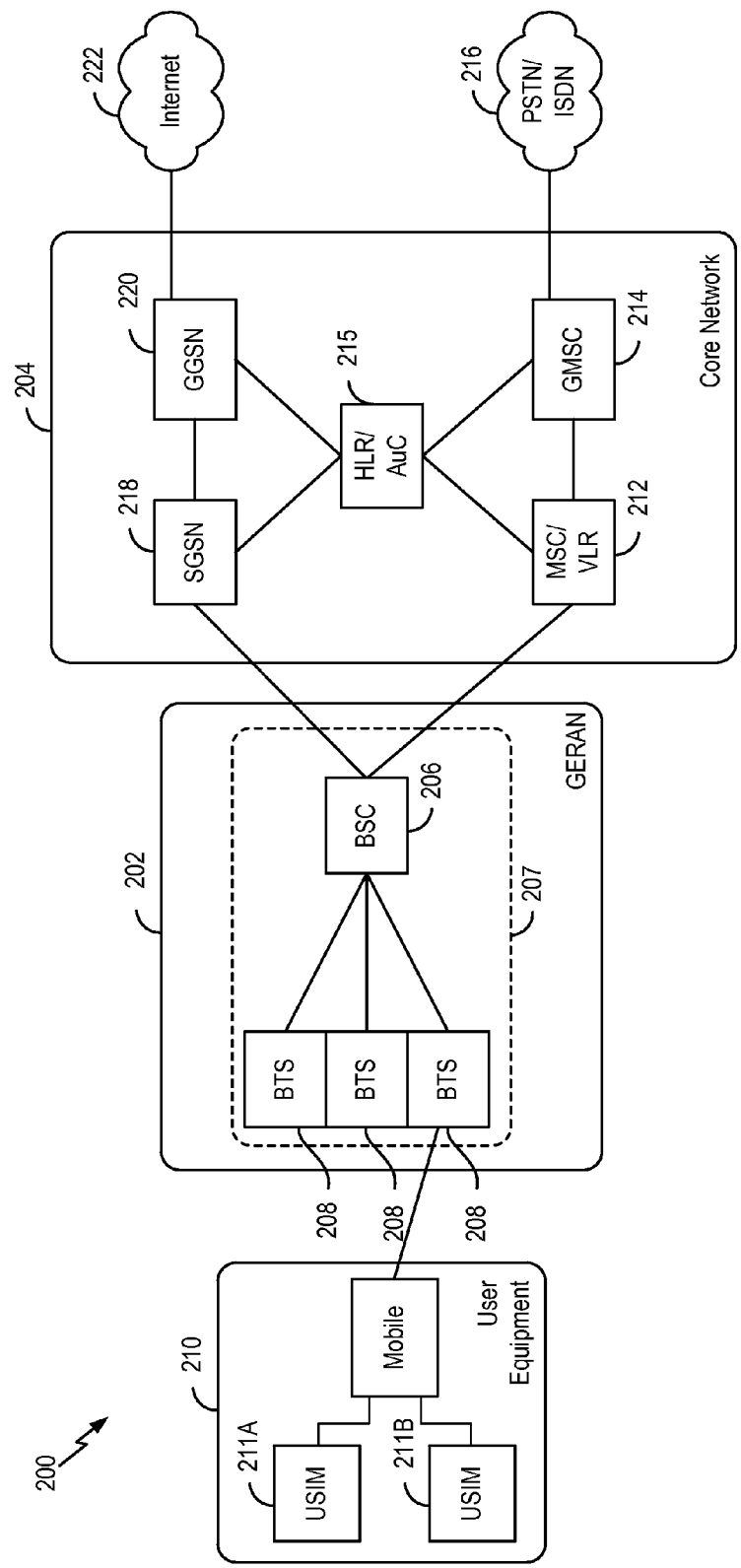
FIG. 2 is a block diagram conceptually illustrating an example of a communication system in which one or more aspects of the disclosure may find application.

Referring now to FIG. 2, as an illustrative example without limitation, various aspects of the present disclosure are illustrated with reference to a GSM system 200. A GSM system includes three interacting domains: a core network 204 (e.g., a GSM/GPRS core network), a radio access network (RAN) (e.g., the GSM/EDGE Radio Access Network (GERAN) 202), and user equipment (UE) 210. In this example, the illustrated GERAN 202 may employ a GSM air interface for enabling various wireless services including telephony, video, data, messaging, broadcasts, and/or other services. The GERAN 202 may include a plurality of Radio Network Subsystems (RNSs) such as an RNS 207, each controlled by a respective Base Station Controller (BSC) such as a BSC 206. Here, the GERAN 202 may include any number of BSCs 206 and RNSs 207 in addition to the illustrated BSCs 206 and RNSs 207. The BSC 206 is an apparatus responsible for, among other things, assigning, reconfiguring, and releasing radio resources within the RNS 207.

The geographic region covered by the RNS 207 may be divided into a number of cells, with a radio transceiver apparatus serving each cell. A radio transceiver apparatus is commonly referred to as a base transceiver station (BTS) in GSM applications, but may also be referred to by those skilled in the art as a base station (BS), a Node B, a radio base station, a radio transceiver, a transceiver function, a basic service set (BSS), an extended service set (ESS), an access point (AP), or some other suitable terminology. For clarity, three BTSs 208 are shown in the illustrated RNS 207; however, the RNSs 207 may include any number of wireless BTSs 208. The BTSs 208 provide wireless access points to a GSM/GPRS core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning devices. The mobile apparatus is commonly referred to as user equipment (UE) in GSM applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The GSM "Um" air interface generally utilizes GMSK modulation (although later enhancements such as EGPRS, described below, may utilize other modulation such as 8PSK), combining frequency hopping transmissions with time division multiple access (TDMA), which divides a frame into 8 time slots. Further, frequency division duplexing (FDD) divides uplink and downlink transmissions using a different carrier frequency for the uplink than that used for the downlink. Those skilled in the art will recognize that although various examples described herein may refer to GSM Um air interface, the underlying principles are equally applicable to any other suitable air interfaces.

In some aspects of the disclosure, the GSM system 200 may be further configured for enhanced GPRS (EGPRS). EGPRS is an extension of GSM technology providing increased data rates beyond those available in 2G GSM technology. EGPRS is also known in the field as Enhanced Data rates for GSM Evolution (EDGE), and IMT Single Carrier.

Specific examples are provided below with reference to the GERAN system. However, the concepts disclosed in various aspects of the disclosure can be applied to any time-division-based system, such as but not limited to a UMTS system using a TDD air interface, or an e-UTRA system using a TD-LTE air interface. Especially in the multi-SIM examples (described in further detail below), the multiple subscriptions might be on any one or more of these systems.

That is, in some aspects of the disclosure, the UE 210 may include a plurality of universal integrated circuit cards (UICC), each of which may run one or more universal subscriber identity module (USIM) applications 211. A USIM stores the subscriber's identity, and provides a user's subscription information to a network as well as performing other security and authentication roles. The illustrated UE 210 includes two USIMs 211A and 211B, but those of ordinary skill in the art will understand that this is illustrative in nature only, and a UE may include any suitable number of USIMs. UEs such as the UE 210 having multiple USIMs are sometimes referred to as multi-SIM/multiple standby devices. One example of a dual-SIM device is a Dual SIM Dual Standby (DSDS) device. Another example of a dual-SIM device is a Dual SIM Dual Active (DSDA) device. A DSDS device is generally capable of being active on two networks concurrently or simultaneously in standby mode, where a transceiver at the UE 210 is time-shared by two subscriptions on the respective networks. In this way, connections or calls may be established on either of the networks or subscriptions with a single device. A DSDA device is generally capable of being active on two networks concurrently or simultaneously. An example of a tri-SIM device is a Tri-SIM Dual Active (TSDA) device.

For illustrative purposes, one UE 210 is shown in communication with one BTS 208 in FIG. 2. The downlink (DL), also called the forward link, refers to the communication link from a BTS 208 to a UE 210, and the uplink (UL), also called the reverse link, refers to the communication link from a UE 210 to a BTS 208.

The core network 204 can interface with one or more access networks, such as the GERAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 204 includes a circuit-switched (CS) domain and a packet-switched (PS) domain. Some of the circuit-switched elements are a Mobile services Switching Centre (MSC) 212, a Visitor Location Register (VLR) 212, and a Gateway MSC (GMSC) 214. Packet-switched elements include a Serving GPRS Support Node (SGSN) 218 and a Gateway GPRS Support Node (GGSN) 220. Some network elements, like EIR, HLR 215, VLR 212, and AuC 215 may be shared by both the circuit-switched and packet-switched domains.

In the illustrated example, the core network 204 supports circuit-switched services with a MSC 212 and a GMSC 214. In some applications, the GMSC 214 may be referred to as a media gateway (MGW). One or more BSCs, such as the BSC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR 218 is also associated with an authentication center (AuC) 215 that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the GERAN 202 to a packet-based network 222. The packet-based network 222 may be the Internet, a private data network, or some other suitable packet-based networks. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

Figure 3:
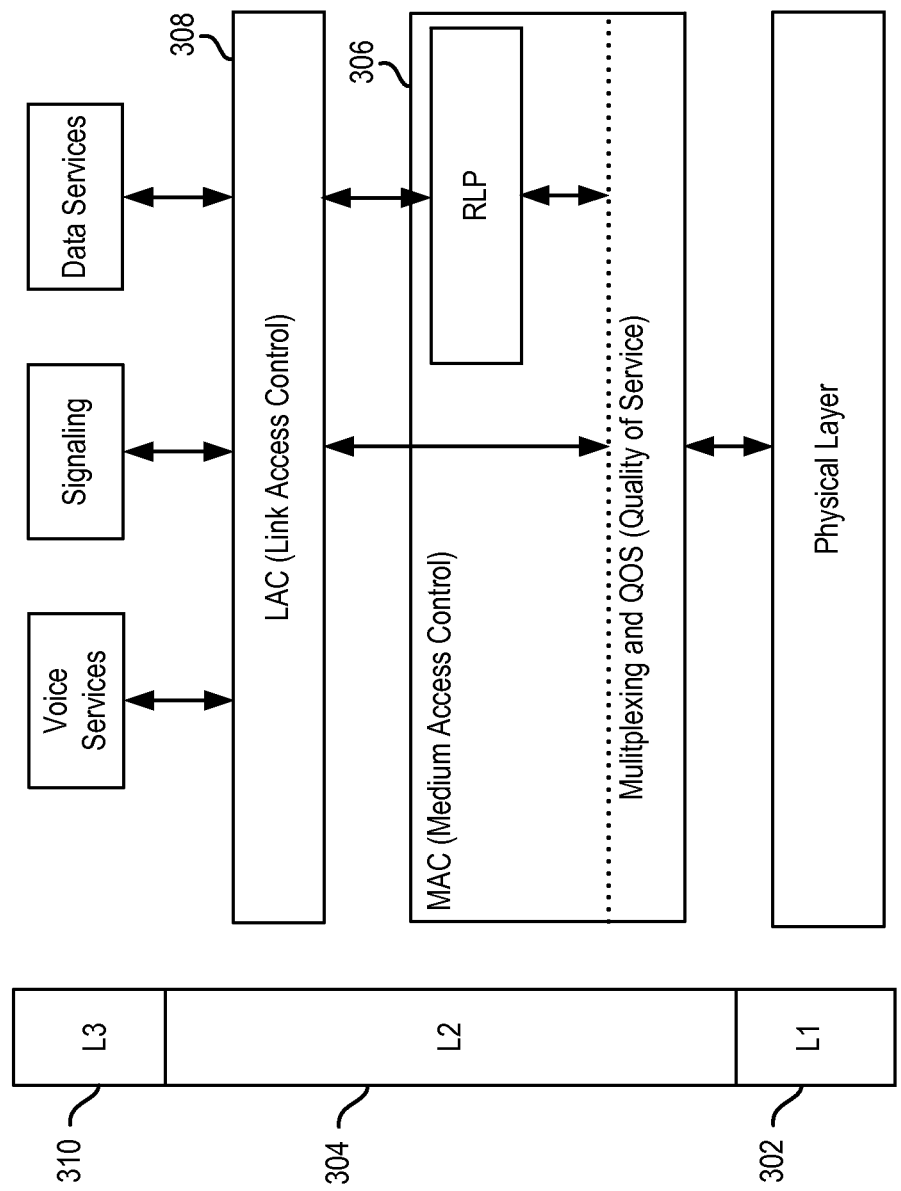
FIG. 3 is a conceptual diagram illustrating an example of a radio protocol architecture implemented at an apparatus according to some aspects of the disclosure.

The UE 210, which may be one of the UEs of FIG. 1, may be adapted to employ a protocol stack architecture for communicating data between the UE 210 and one or more network nodes of the GSM system 200 (e.g., the BTS 208). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by a UE 210. The protocol stack architecture for the UE 210 is shown to generally include three layers: Layer 1(L1), Layer 2(L2), and Layer 3 (L3).

Layer 1302 is the lowest layer and implements various physical layer signal processing functions. Layer 1302 is also referred to herein as the physical layer 302. This physical layer 302 provides for the transmission and reception of radio signals between the UE 210 and a BTS 208.

The data link layer, called layer 2 (or "the L2 layer") 304 is above the physical layer 302 and is responsible for delivery of signaling messages generated by Layer 3. The L2 layer 304 makes use of the services provided by the physical layer 302. The L2 layer 304 may include two sublayers: the Medium Access Control (MAC) sublayer 306, and the Link Access Control (LAC) sublayer 308.

The MAC sublayer 306 is the lower sublayer of the L2 layer 304. The MAC sublayer 306 implements the medium access protocol and is responsible for transport of the higher layers' protocol data units using the services provided by the physical layer 302. The MAC sublayer 306 may manage the access of data from the higher layers to the shared air interface. The MAC sublayer 306 also may include or interface with radio link protocol (RLP) functions, multiplexing functions, and QoS functions.

The LAC sublayer 308 is the upper sublayer of the L2 layer 304. The LAC sublayer 308 implements a data link protocol that provides for the correct transport and delivery of signaling messages generated at the layer 3. The LAC sublayer makes use of the services provided by the lower layers (e.g., Layer 1and the MAC sublayer).

Layer 3 310, which may also be referred to as the upper layer or the L3 layer, originates and terminates signaling messages according to the semantics and timing of the communication protocol between a BTS 208 and a UE 210. The L3 layer 310 makes use of the services provided by the L2 layer. Information (e.g., voice service, data services, and signaling) messages are also passed through the L3 layer 310.

Figure 4:
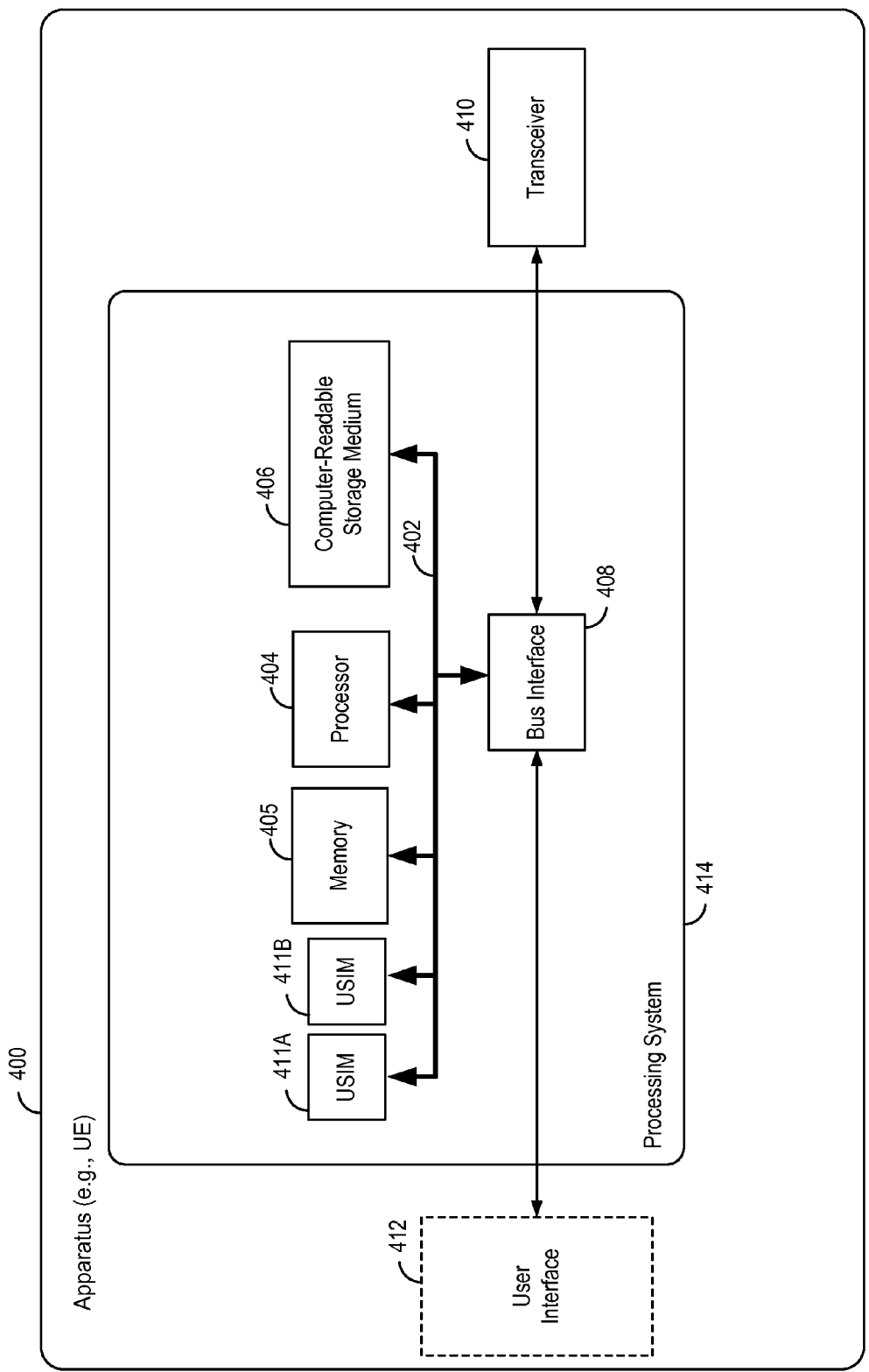
FIG. 4 is a block diagram illustrating an example of a hardware implementation for an apparatus employing a processing system according to some aspects of the disclosure.

FIG. 4 is a block diagram illustrating an example of a hardware implementation for an apparatus 400 (e.g., a UE or a mobile station) employing a processing system 414. In accordance with various aspects of the disclosure, an element, or any portion of an element, or any combination of elements may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits or components including one or more processors (represented generally by the processor 404), a memory 405, computer-readable media (represented generally by the computer-readable medium 406), and one or more USIMs (e.g., dual USIMs 411A and 411B). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. As discussed in more detail below, a multi-SIM device such as the illustrated apparatus 400 including two USIMs 411A and 411B may communicate via one or more transceivers 410.

Depending upon the nature of the apparatus, a user interface 412 (e.g., keypad, display, speaker, microphone, joystick) may also be provided. The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
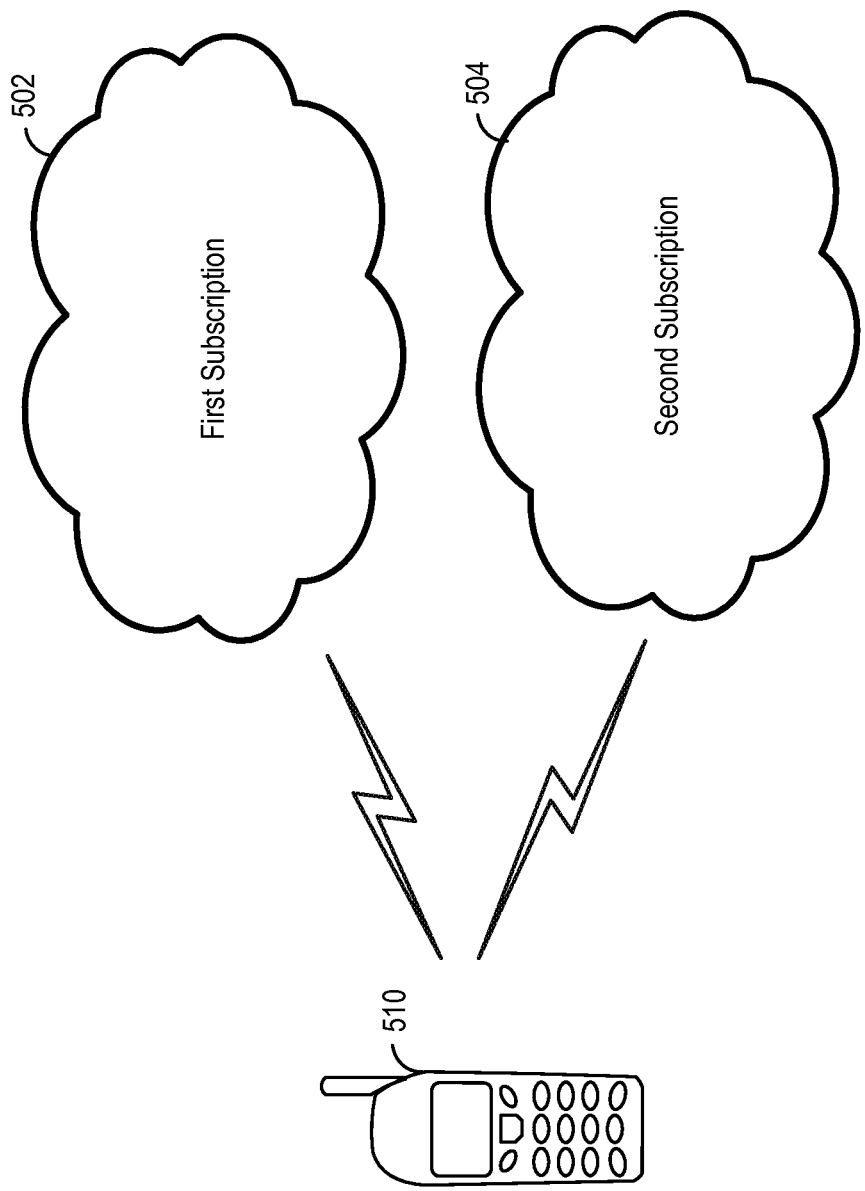
FIG. 5 is a conceptual diagram illustrating an apparatus that supports a first subscription and a second subscription according to some aspects of the disclosure.

As described above, the illustrated apparatus 400 is a dual-SIM device capable of maintaining two subscriptions on the GSM network 200 and/or other networks. FIG. 5 is a drawing conceptually illustrating a dual-SIM UE 510 configured to concurrently operate in a first subscription 502 and a second subscription 504. The first subscription 502 and the second subscription 504 may be associated with the same wireless network or different wireless networks. For example, the first subscription 502 and the second subscription 504 may be associated with the same or different GSM networks. Here, the UE 510 may be configured to be concurrently active on both subscriptions. In some aspects of the disclosure, the first subscription 502 and the second subscription 504 may correspond to different frequencies, timeslots, training sequence codes, radio access technologies, scrambling codes, or a combination thereof.

VAMOS

VAMOS allows multiplexing of two users simultaneously on the same physical resource, using the same timeslot number, absolute RF channel number (ARFCN), and TDMA frame number for GSM traffic. Thus, a basic physical channel that is VAMOS-capable can support up to four traffic channels (TCH) along with their associated control channels.

Figure 6:
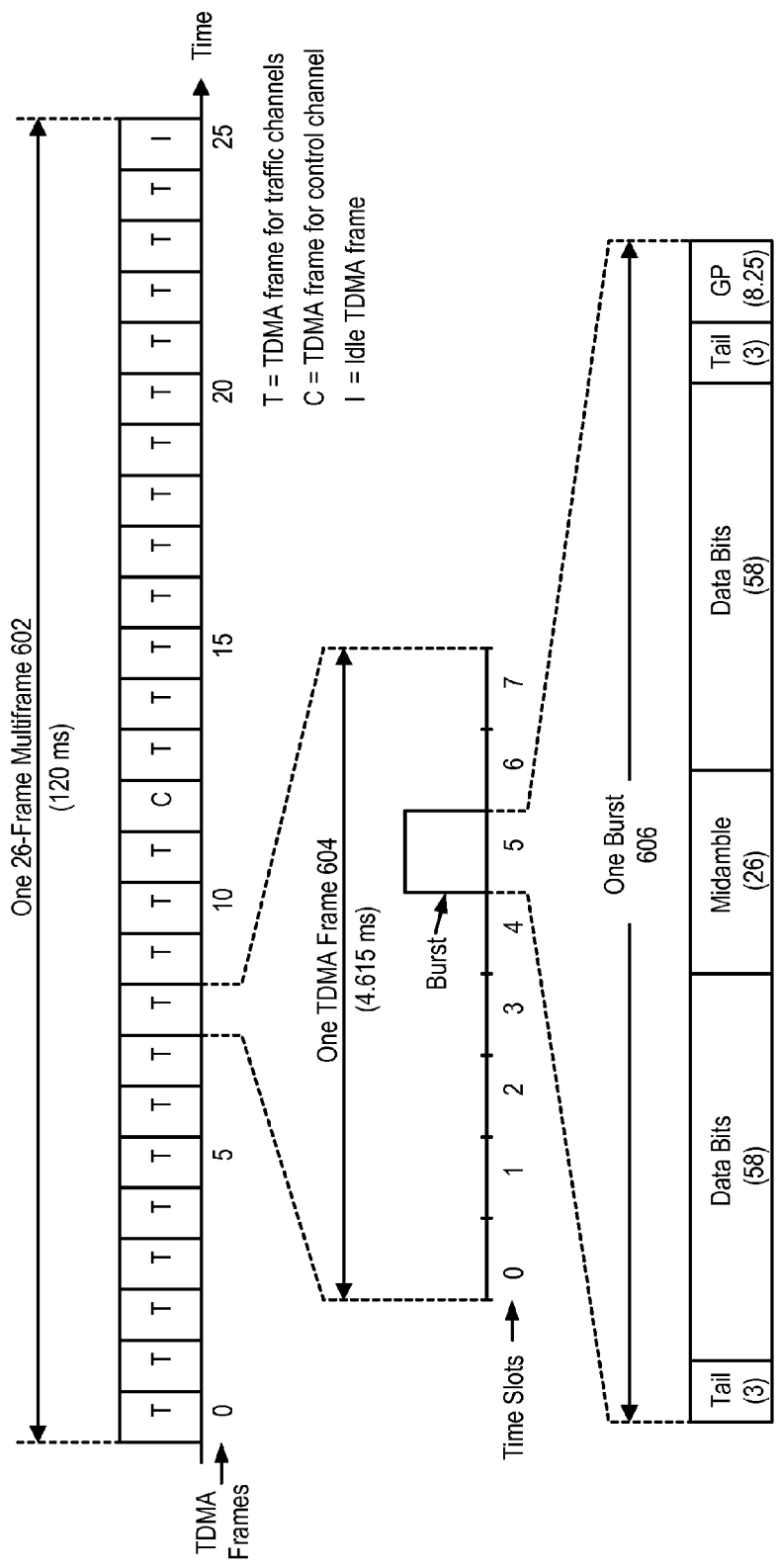
FIG. 6 is a diagram illustrating an example of frame and burst formats in GSM according to some aspects of the disclosure.

FIG. 6 shows example frame and burst formats in GSM. These frame and burst formats may be used for the uplink and downlink. The timeline for transmission is divided into a number of frames (e.g., a multiframe 602). For traffic channels used to transmit user-specific data, each multiframe 602 in this example includes 26 TDMA frames 604, which are labeled as TDMA frames 0 through 25. The traffic channels are sent in TDMA frames 0 through 11 and TDMA frames 13 through 24 of each multiframe 602. A control channel is sent in TDMA frame 12. No data is sent in an idle TDMA frame 25, which is used by wireless communication devices to make measurements of signals transmitted by neighbor base stations.

Each time slot within a frame is also referred to as a "burst" 606 in GSM. Each burst 606 includes two tail fields, two data fields, a training sequence (or midamble) field and a guard period (GP). The number of symbols in each field is shown inside the parentheses. A burst 606 includes symbols for the tail, data, and midamble fields. No symbols are sent in the guard period. TDMA frames of a particular carrier frequency are numbered and formed in groups of 26 or 51 TDMA frames 604 called multiframes 602.

Also, each base station is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device or user is assigned one or more time slot indices for the duration of a call. User-specific data for each wireless communication device is sent in the time slot(s) assigned to that wireless communication device and in TDMA frames used for the traffic channels.

In VAMOS, a pair of TCH channels along with their associated control channels sharing the same timeslot number, ARFCN, and TDMA frame number is referred to as a VAMOS pair. The TCH channels along with their associated control channels in a VAMOS pair are referred to as VAMOS subchannels. In a VAMOS pair, each VAMOS subchannel is assigned a training sequence that is different from the training sequence assigned to the other VAMOS subchannel. In addition, for uplink traffic, two Gaussian minimum shift keying (GMSK) modulated symbols are transmitted simultaneously in the same radio resource, identified by the same timeslot number, ARFCN, and TDMA frame number, in a given cell. For downlink traffic, a pair of corresponding bits from the TCHs and associated control channels in the VAMOS pair is mapped to an asynchronous quadrature phase shift keying (AQPSK) modulation symbol.

Figure 7:
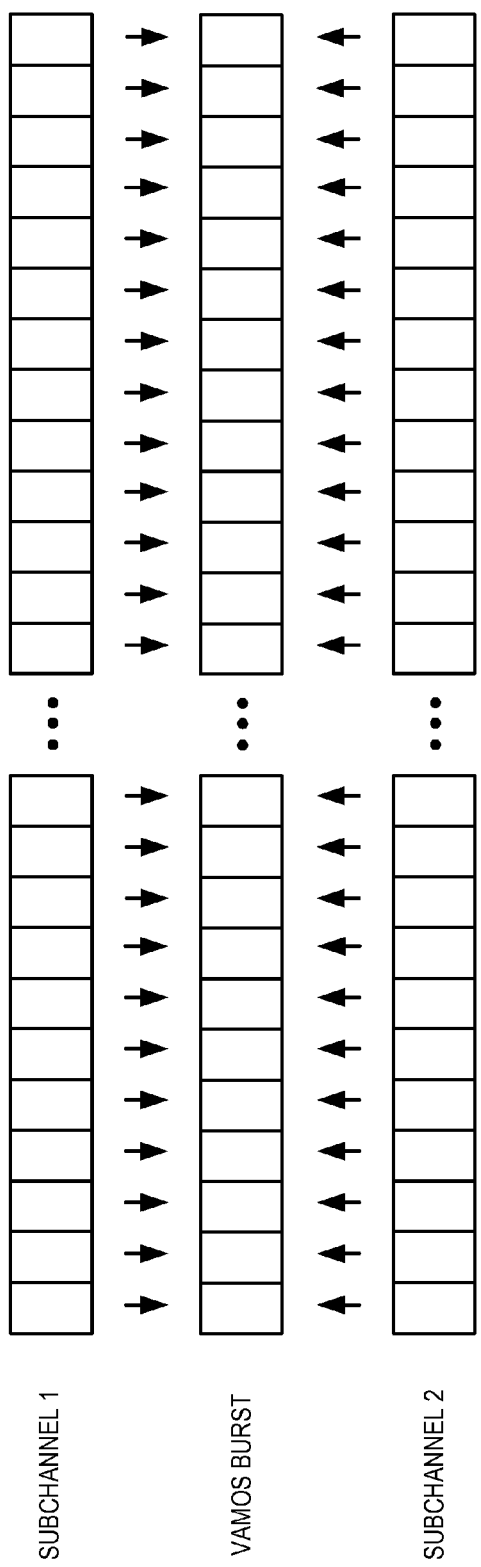
FIG. 7 is a diagram illustrating an example of combining multiple subchannels into a single burst.

FIG. 7 illustrates, in a conceptual manner, that the symbols of two subchannels are combined to provide a VAMOS burst. Since the subchannels are sharing the same physical resource, the symbols of the two subchannels will interfere with each other. For example, when SCPIR=0 (SCPIR may be allowed to vary, for example, from +10 dB to −10 dB), a VAMOS channel may receive 3 dB less power due to the peak to average effect of the interference in the VAMOS channel. Moreover, even if a UE supports interference rejection combining (IRC), single antenna interference cancellation (SAIC), and advanced versions of VAMOS (e.g., VAMOS II), receiver performance and, hence, voice quality, at the UE may be adversely affected. Also, low cost DSDA/TSDA UEs might not have separate secondary receive (Rx) chains and might not support advanced versions of VAMOS (e.g., VAMOS III). Consequently, particularly in UE designs that employ less sensitive RF chains, the use of VAMOS may negatively impact the user experience.

Opportunistic Receive Diversity

Figure 8:
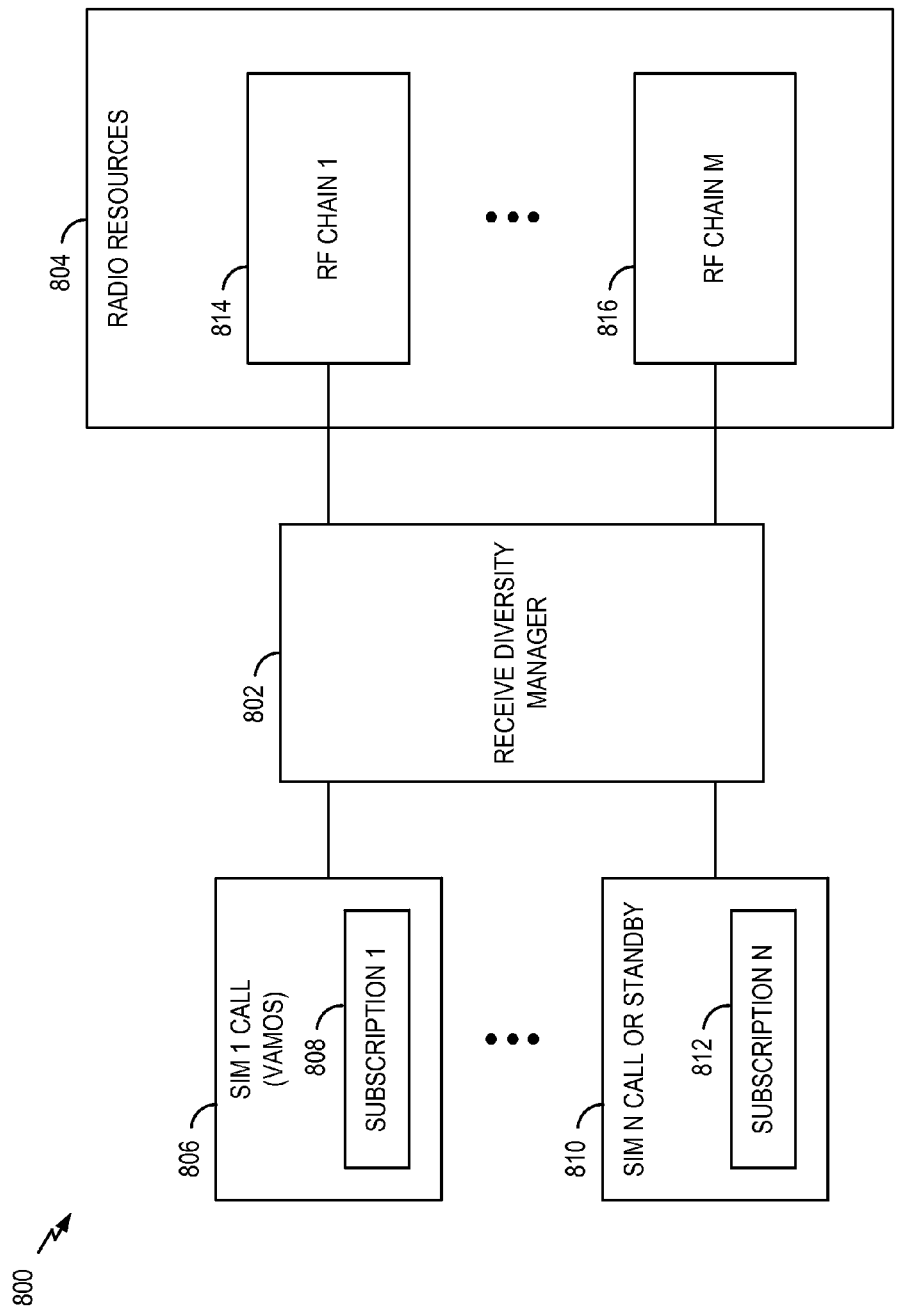
FIG. 8 is a block diagram illustrating example components for conditionally providing receive diversity according to some aspects of the disclosure.

The disclosure relates in some aspects to opportunistically enabling receive diversity (RxD) when a VAMOS TDMA slot is assigned to a multi-SIM UE. For example, receive diversity may be assigned to a VAMOS call based on receive chain availability, channel conditions (e.g., SINR and/or RSSI), and the state of the other subscription(s) in the UE. FIG. 8 illustrates an example of an apparatus 800 (e.g., a UE) where a receive diversity manager 802 opportunistically determines whether to assign additional radio resources 804 to a VAMOS call.

In this example, a call 806 that uses a first SIM (SIM 1) associated with a first subscription 808 has been allocated a VAMOS channel by the network (not shown). In addition, the call 806 may have been assigned (e.g., allocated) a first RF chain 814 (e.g., an RxTx chain). For example, the call 806 may have been set up using the first RF chain 814. As used herein, the term RF chain or receive chain refers to one or more components of an RF system. For example, an RF chain may comprise at least one of: an antenna, a receiver circuit, a transmitter circuit, a transceiver circuit, or other functionality that supports RF signaling.

Another SIM (SIM N) is associated with another subscription 812 that may have an active call or is handling standby operations 810. The call or standby operations 810 may have been allocated a VAMOS channel or some other type of channel by the network. In addition, the call or standby operations 810 may be assigned another RF chain 816 (e.g., a TxRx chain or an Rx-only chain).

Under certain circumstances, the receive diversity manager 802 may provide receive diversity to the call 806 by assigning another RF chain (e.g., the RF chain 816) to the call 806 in addition to the first RF chain 814. As discussed below in conjunction with FIGS. 9-13, a decision to assign additional radio resources (e.g., diversity RF resources) to a VAMOS call may be based on one or more of an operating condition associated with another subscription, channel conditions associated with the VAMOS call, or some other factor.

Figure 9:
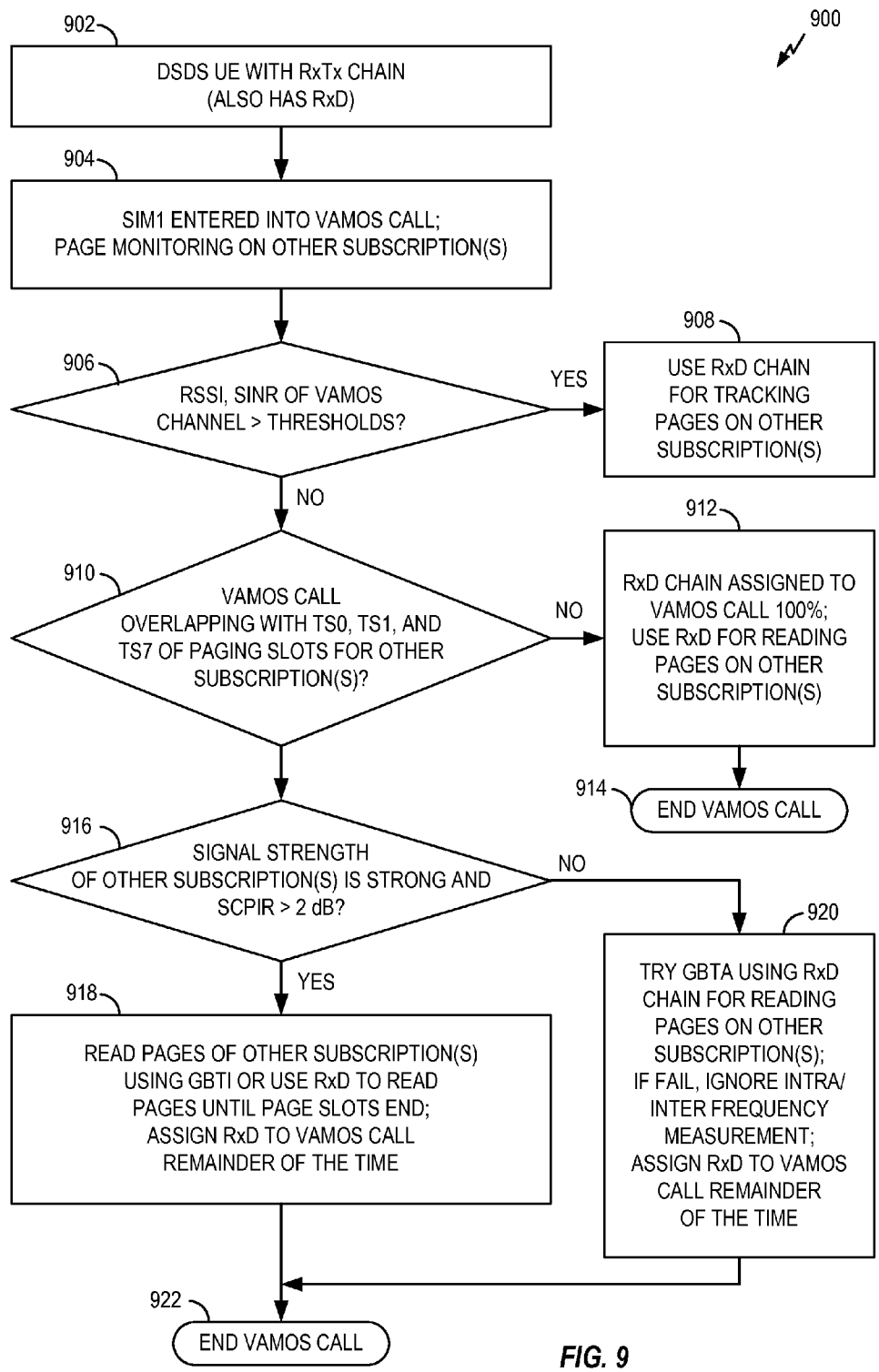
FIG. 9 is a flowchart illustrating an example of a process for conditionally providing receive diversity according to some aspects of the disclosure.

FIG. 9 illustrates an example of opportunistic receive diversity operations 900 that may be employed in a DSDS device. As indicated at block 902, this device may include, for example, a single RxTx chain and a single Rx-only chain (the RxD chain).

In this example, if one subscription is operating on a VAMOS call, receive diversity may conditionally be assigned to that subscription based on RF channel conditions such as RSSI and SINR, and other factors. Other subscription(s) supported by the DSDS device will monitor for page messages according to a page schedule (block 904).

Thresholds for RSSI and SINR are defined in an attempt to maximize the gain that can be achieved from this opportunistic scheme. For example, once one subscription enters into traffic (e.g., an active call), the RF RSSI and SINR of the VAMOS channel can be measured (e.g., at designated times t). As represented by blocks 906 and 908, if the RSSI and SINR of the VAMOS signal are greater than (or greater than or equal to) the respective thresholds, the Rx-only chain is only used to track the paging messages for the other subscription(s). That is, if the VAMOS channel has good channel conditions, the Rx-only chain is used for the other subscription(s) rather than the VAMOS channel.

Conversely, if RSSI and SINR of the VAMOS signal are less than (or less than or equal to) the respective thresholds, the Rx-only chain is assigned based on whether time slot collisions occur between the different subscriptions. Thus, in the event the VAMOS channel is experiencing poor channel conditions, the DSDS device may be able to use the Rx-only chain to provide receive diversity for the VAMOS channel, provided that this does not significantly impact the performance of the other subscription(s).

As represented by blocks 910 and 912, if the VAMOS call does not overlap with timeslots 0, 1, and 7 (TS0, TS1 and TS7) of the other subscription(s) in the case there the other subscription(s) needs to receive paging messages on those timeslots, the following operations are performed. The Rx-only chain can be assigned to the VAMOS call 100% of the time that the VAMOS call can use the chain (e.g., timeslots other than TS0, TS1, and TS7). The Rx-only chain is assigned to the other subscription(s) during the paging bursts for the other subscription(s). The DSDS device can thus tune to the broadcast channel (BCCH) carrier of the other subscription(s) at TS0, for example. After the page slot has passed, the Rx-only chain can be tuned to the VAMOS traffic channel (TCH). These operations continue until the VAMOS call ends (block 914).

Conversely, if the VAMOS call does overlap with timeslots 0, 1, and 7 (TS0, TS1 and TS7) of the other subscription(s) in the case there the other subscription(s) needs to receive paging messages on those timeslots, the assignment of receive diversity is managed as follows.

As represented by blocks 916 and 918, if another subscription has good channel conditions (e.g., high RSSI and SCPIR>−2 dB) during its previous page slot, receive diversity for VAMOS may be curtailed. For example, the Rx-only chain may be assigned to the other subscription(s) with the good RF channel (at least until the page reading is complete). In the event there are any other subscriptions that do not have good channel conditions, the paging messages for those subscription may be received using GPRS Burst Tune Away (GBTA).

As represented by block 920, if another subscription does not have a good enough channel condition for decoding received pages (e.g., due to control channel interference (CCI)), an attempt is made to receive the paging messages using GBTA with the Rx-only chain. If the paging messages cannot be read (e.g., during subsequent page wakeup times), page reading for that subscription will be ignored. In addition, any other operations (e.g., inter/intra cell measurements, etc.) will also be ignored. In this case, the Rx-only chain is assigned to the VAMOS call (e.g., to the VAMOS TCH channel) since the other subscription(s) are not currently able to effectively use the Rx-only chain.

For page repeating, the DSDS device can ignore page monitoring on other subscriptions during alternative page slots or the DSDS device can ignore page monitoring. Again, the above operations may continue until the VAMOS call ends (block 922).

FIGS. 10-13 illustrate examples of opportunistic receive diversity operations that may be employed in a DSDA device or a TSDA device.

Figure 10:
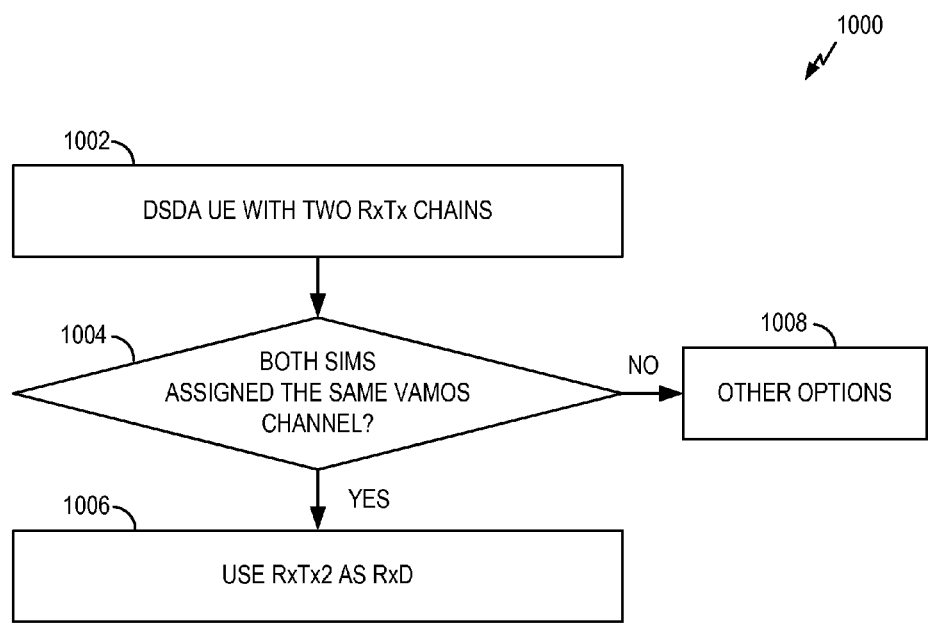
FIG. 10 is a flowchart illustrating another example of a process for conditionally providing receive diversity according to some aspects of the disclosure.

Referring initially to the process 1000 of FIG. 10, as indicated at block 1002, a DSDA device may include, for example, two RxTx chains.

As represented by blocks 1004 and 1006, if both SIMs are assigned the same VAMOS channel (same ARFCN, same time slot, etc.), the DSDA device can use the second RxTx chain (RxTx2) to provide receive diversity for the VAMOS channel. Also, the procedures described above at FIG. 9 may be applicable here.

Conversely, as represented by block 1008, if both SIMs are not assigned the same VAMOS channel, other operations as discussed herein may be employed or receive diversity may be unavailable.

Figure 11:
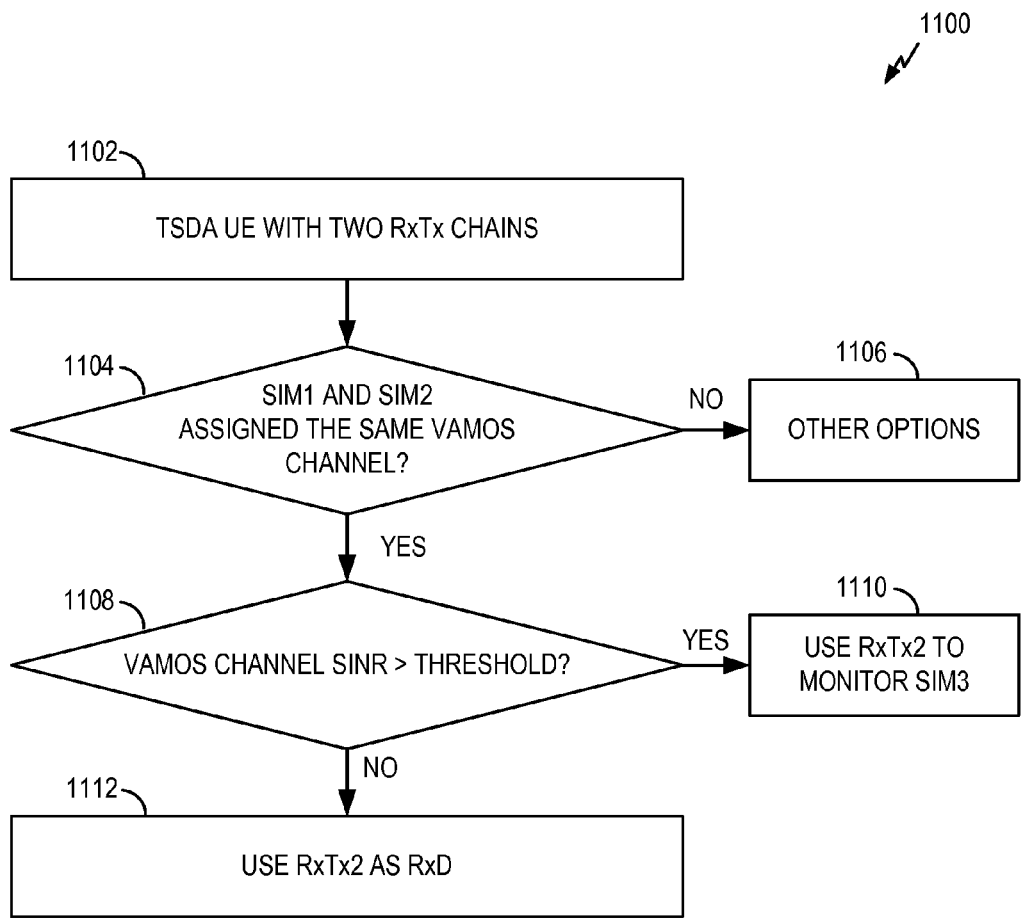
FIG. 11 is a flowchart illustrating another example of a process for conditionally providing receive diversity according to some aspects of the disclosure.

Referring to the process 1100 of FIG. 11, as indicated at block 1102, a TSDA device may include, for example, two RxTx chains.

As represented by blocks 1104 and 1106, if no two of the SIMs are assigned the same VAMOS channel, other operations as discussed herein may be employed or receive diversity may be unavailable.

As represented by blocks 1108 and 1110, however, if two of the SIMs (SIM1 and SIM2) are assigned the same VAMOS channel, the TSDA device can use the second RxTx chain (RxTx2) to receive messages for the third SIM (SIM3). This mode of operation is employed if the SINR of the VAMOS channel is greater than (or greater than or equal to) a threshold (block 1108). That is, if the VAMOS channel has good channel conditions, the second RxTx chain is used for SIM3 rather than the VAMOS channel.

Conversely, as represented by block 1112, if both SIMs are assigned the same VAMOS channel, and if the SINR of the VAMOS channel is less than (or less than or equal to) a threshold, the TSDA device can prioritize the VAMOS call. That is, in the event the VAMOS channel is experiencing poor channel conditions, the TSDA device can use the second RxTx chain (RxTx2) to provide receive diversity for the VAMOS channel. In this case, the TSDA device can ignore paging messages for SIM3 until the VAMOS call ends.

Figure 12:
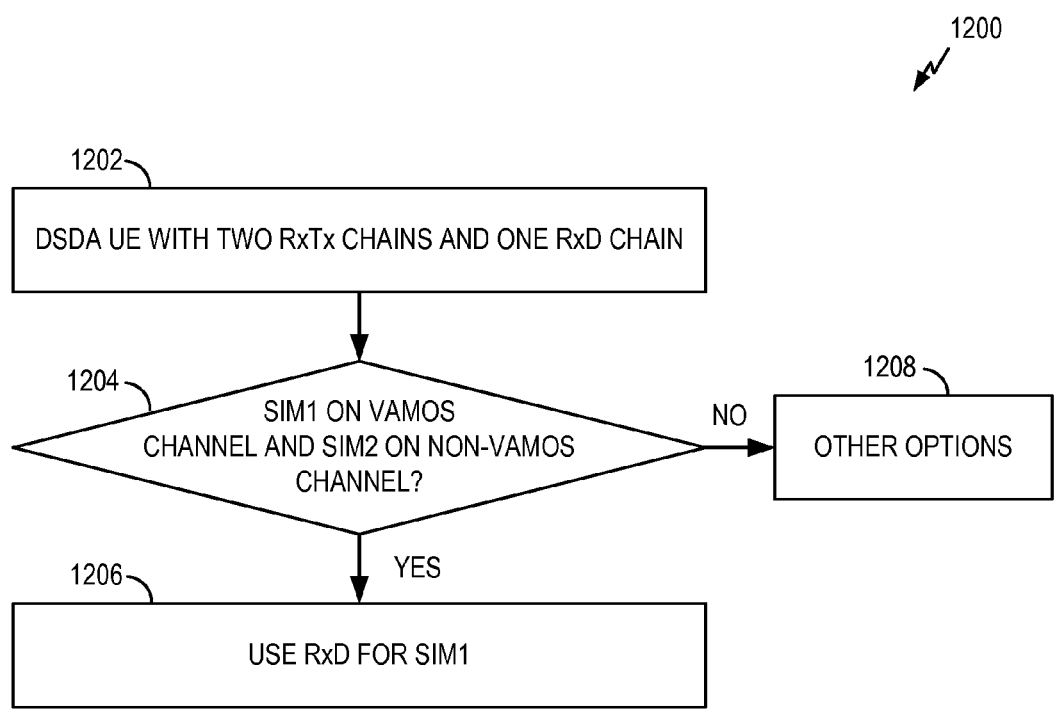
FIG. 12 is a flowchart illustrating another example of a process for conditionally providing receive diversity according to some aspects of the disclosure.

Referring to the process 1200 of FIG. 12, as indicated at block 1202, a DSDA device may include, for example, two RxTx chains and one receive diversity (RxD) chain (e.g., an Rx-only chain).

As represented by blocks 1204 and 1206, if one SIM (SIM1) is assigned to a VAMOS channel and the other SIM (SIM2) is assigned to a normal channel (i.e., a non-VAMOS channel), the DSDA device can use the receive diversity chain (RxD) to provide receive diversity for the VAMOS channel (SIM1).

Conversely, as represented by block 1208, if the SIMs are not assigned to different types of channels, other operations as discussed herein may be employed or receive diversity may be unavailable.

Figure 13:
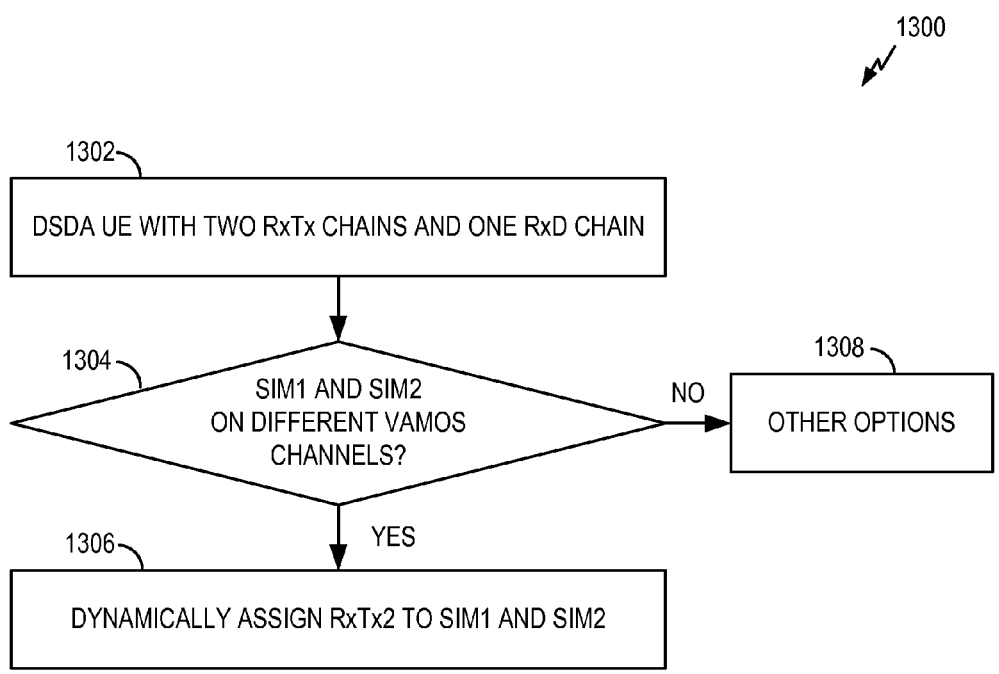
FIG. 13 is a flowchart illustrating another example of a process for conditionally providing receive diversity according to some aspects of the disclosure.

Referring to the process 1300 of FIG. 13, as indicated at block 1302, a DSDA device may include, for example, two RxTx chains and one receive diversity (RxD) chain (e.g., an Rx-only chain).

As represented by blocks 1304 and 1306, one SIM (SIM1) may be assigned to one VAMOS channel and the other SIM (SIM2) may be assigned to a different VAMOS channel. That is, each SIM is assigned a training sequence code (TSC) from the VAMOS TSC set, but the SIMs are assigned different ARFCNs and time slots. In this case, the DSDA device can dynamically assign the RxD chain (e.g., Rx-only) to provide receive diversity for both VAMOS channels (SIM1 and SIM2). For example, the RxD chain may be assigned based on the current SNR and RSSI of the two RF channels (e.g., the channel with the worst conditions gets the RxD chain).

As represented by block 1308, if the SIMs are not assigned to different VAMOS channels, other operations as discussed herein may be employed or receive diversity may be unavailable.

Figure 14:
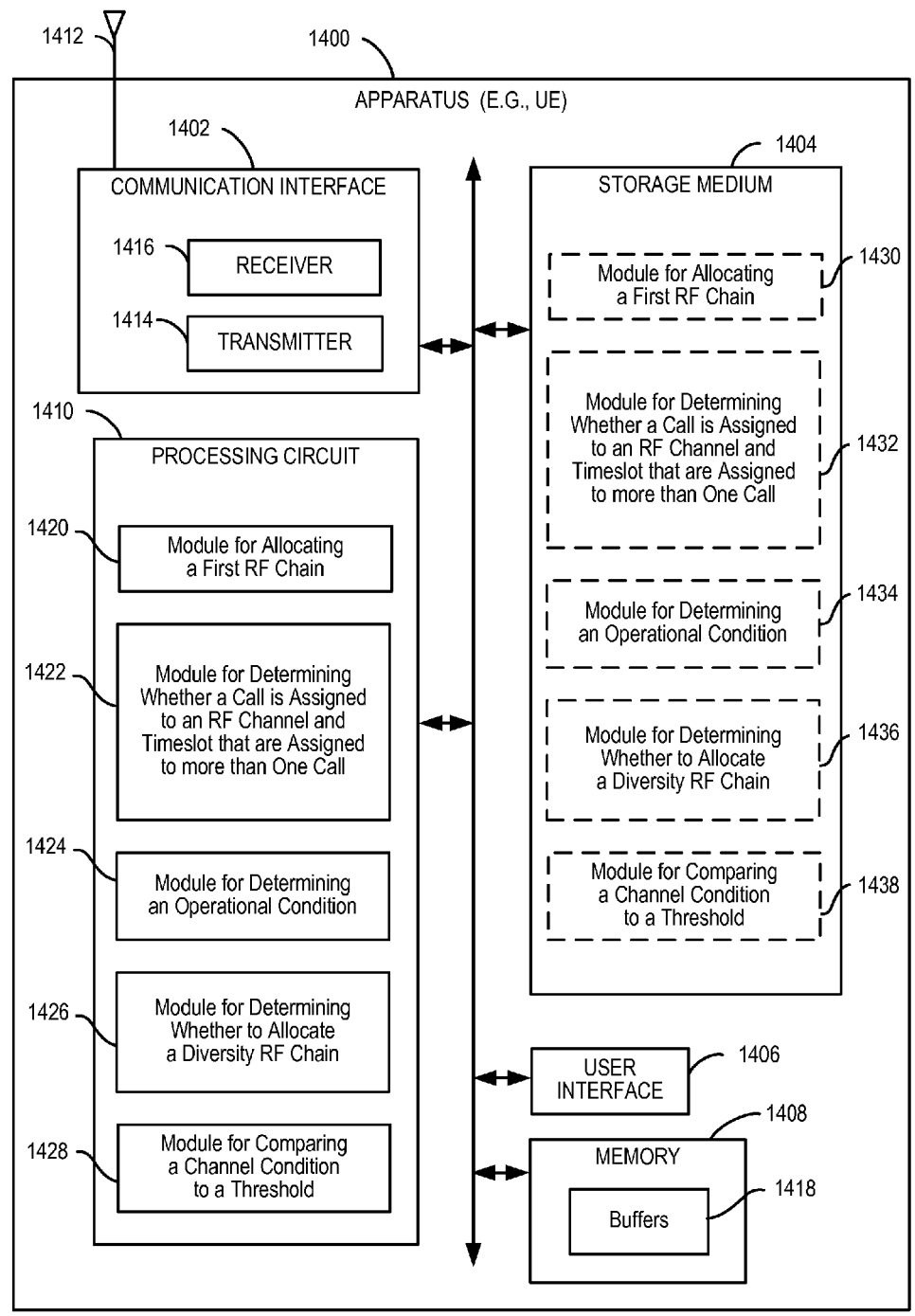
FIG. 14 is a block diagram illustrating select components of an apparatus configured to provide receive diversity according to some aspects of the disclosure.

FIG. 14 is an illustration of an apparatus 1400 (e.g., the UE 210) configured according to one or more aspects of the disclosure. The apparatus 1400 includes a communication interface (e.g., at least one transceiver) 1402, a storage medium 1404, a user interface 1406, a memory 1408, and a processing circuit 1410. These components can be coupled to and/or placed in electrical communication with one another via a signaling bus or other suitable component. In particular, each of the communication interface 1402, the storage medium 1404, the user interface 1406, and the memory 1408 are coupled to and/or in electrical communication with the processing circuit 1410.

The communication interface 1402 may be adapted to facilitate wireless communication of the apparatus 1400. For example, the communication interface 1402 may include circuitry and/or programming adapted to facilitate the communication of information bi-directionally with respect to one or more communication devices in a network. The communication interface 1402 may be coupled to one or more antennas 1412 for wireless communication within a wireless communication system. The communication interface 1402 can be configured with one or more standalone receivers and/or transmitters, as well as one or more transceivers. In the illustrated example, the communication interface 1402 includes a transmitter 1414 and a receiver 1416.

The memory 1408 may represent one or more memory devices. As indicated, the memory 1408 may maintain various buffers 1418 (e.g., scheduled flow buffer and non-scheduled flow buffer) along with other information used by the apparatus 1400. In some implementations, the memory 1408 and the storage medium 1404 are implemented as a common memory component. The memory 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

Alternatively, in some implementations, a computer-readable medium may include, by way of example, a carrier wave, a transmission line, and any other suitable medium for transmitting software and/or instructions that may be accessed and read by a computer.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such programming stored on the storage medium 1404. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. As used herein, the term "adapted" in relation to the processing circuit 1410 may refer to the processing circuit 1410 being one or more of configured, employed, implemented, and/or programmed to perform a particular process, function, operation and/or routine according to various features described herein.

According to at least one example of the apparatus 1400, the processing circuit 1410 may include one or more of a module for allocating a first RF chain 1420, a module for determining whether the call is assigned to an RF channel and timeslot that are assigned to more than one call 1422, a module for determining an operational condition 1424, a module for determining whether to allocate a diversity RF chain 1426, or a module for comparing a channel condition to a threshold 1428.

The module for allocating a first RF chain 1420 may include circuitry and/or programming (e.g., a module for allocating a first RF chain 1430 stored on the storage medium 1404) adapted to determine that a call is to be established, acquire parameters that are used to establish the call, and send a request to an RF component to commence signaling for the call.

The module for determining whether the call is assigned to an RF channel and timeslot that are assigned to more than one call 1422 may include circuitry and/or programming (e.g., a module for determining whether the call is assigned to an RF channel and timeslot that are assigned to more than one call 1432 stored on the storage medium 1404) adapted to identify a type of channel that has been assigned to a call, identify conditions on a channel that has been assigned to a call, or receive a message indicative of the assigned channel. In addition, the circuitry and/or programming may determine, based on the channel information, whether the channel is a VAMOS or similar channel, and generate an indication of the determination.

The module for determining an operational condition 1424 may include circuitry and/or programming (e.g., a module for determining an operational condition 1434 stored on the storage medium 1404) adapted to obtain information regarding a subscription, compare the acquired information with known operational conditions, and generate an indication based on the comparison.

The module for determining whether to allocate a diversity RF chain 1426 may include circuitry and/or programming (e.g., a module for determining whether to allocate a diversity RF chain 1436 stored on the storage medium 1404) adapted to obtain information for making the determination, conduct one or more of the operations described herein at FIG. 9-13, 15, or 16, and generate an indication as to whether the diversity RF chain is to be allocated.

The module for comparing a channel condition to a threshold 1428 may include circuitry and/or programming (e.g., a module for comparing a channel condition to a threshold 1438 stored on the storage medium 1404) adapted to obtain channel condition information, obtain threshold information, compare the obtained information, and generate an indication based on the comparison.

As mentioned above, programming stored by the storage medium 1404, when executed by the processing circuit 1410, causes the processing circuit 1410 to perform one or more of the various functions and/or process operations described herein. For example, the storage medium 1404 may include one or more of the module (e.g., operations) for allocating a first RF chain 1430, the module for determining whether the call is assigned to an RF channel and timeslot that are assigned to more than one call 1432, the module for determining an operational condition 1434, the module for determining whether to allocate a diversity RF chain 1436, or the module for comparing a channel condition to a threshold 1438.

Figure 15:
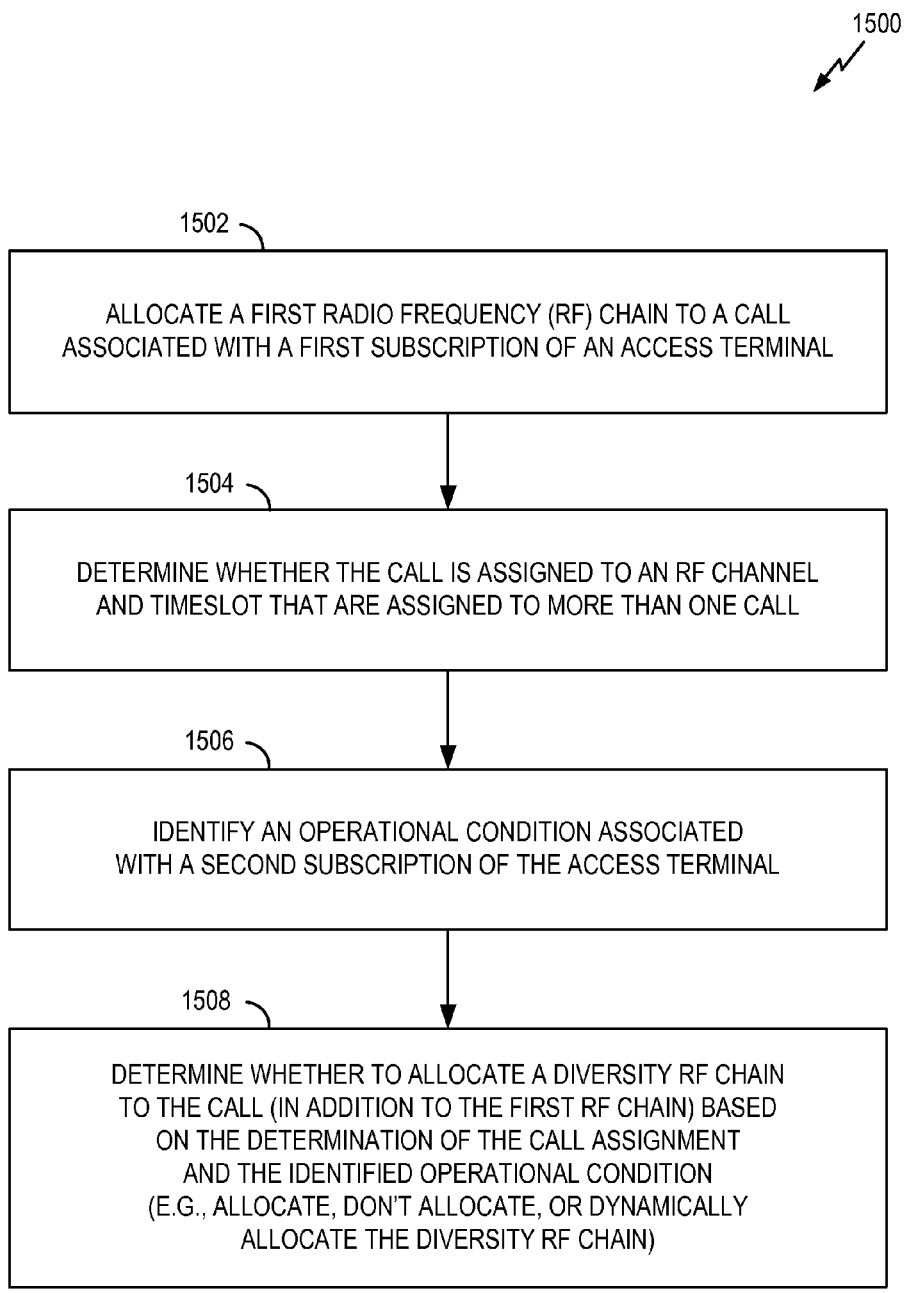
FIG. 15 is a flowchart illustrating an example of a process for conditionally allocating an RF chain according to some aspects of the disclosure.

FIG. 15 illustrates a process 1500 for providing receive diversity in accordance with some aspects of the disclosure. The process 1500 may take place within a processing circuit 1410 (FIG. 14), which may be located at a UE or some other suitable apparatus. In another aspect, the process 1500 may be implemented by any of the UEs 130-140 illustrated in FIG. 1. Of course, in various aspects within the scope of the present disclosure, the process 1500 may be implemented by any suitable apparatus capable of supporting diversity operations.

As discussed herein, the process 1500 may be operable at a UE configured for VAMOS operation and multi-SIM operation.

At block 1502, a first radio frequency (RF) chain is allocated to a call associated with a first subscription of an access terminal (e.g., a UE). For example, a multi-SIM access terminal may establish a call using one of the SIMs of the access terminal, where the call is supported by the first RF chain. In some aspects, the first RF chain may comprise at least one of: an antenna, a receiver circuit (e.g., an Rx-only circuit), a transceiver circuit (e.g., a TxRx circuit), or some other type of RF component.

At block 1504, a determination is made as to whether the call of block 1502 is assigned to an RF channel and timeslot that are assigned to more than one call. This may involve, for example, determining whether the call is established on a VAMOS channel (e.g., the call is a GSM VAMOS call).

At block 1506, an operational condition associated with a second subscription of the access terminal is identified. The second subscription is associated with a second subscriber identity module of the device.

The operational condition may take various forms in different implementations. In some aspects, the operational condition may relate to whether paging messages for the second subscription are received during any timeslot used by the call. In some aspects, the operational condition may relate to comparison of a channel condition associated with the reception of the paging messages to a threshold. In some aspects, the channel condition may correspond to at least one of: a received signal strength indication or a signal-to-interference-and-noise ratio. In some aspects, the operational condition may relate to whether the second subscription is assigned to the same RF channel and timeslot that are assigned to the call. In some aspects, the operational condition may relate to whether the second subscription is assigned to an RF channel and timeslot that are not assigned to more than one call. In some aspects, the operational condition may relate to whether a second call using the second subscription is assigned to a second RF channel and a second timeslot that are assigned to more than one call, where the second RF channel and the second timeslot assigned to the second call are different from the RF channel and the timeslot assigned to the call that uses the first subscription.

At block 1508, a determination is made as to whether to allocate a diversity RF chain (e.g., a second RF chain) to the call in addition to the first RF chain. This determination is based on the determination of the call assignment at block 1504 and the operational condition identified at block 1506. In some aspects, the diversity RF chain may comprise at least one of: an antenna, a receiver circuit (e.g., an Rx-only circuit), a transceiver circuit (e.g., a TxRx circuit), or some other type of RF component.

In some implementations the operations of blocks 1502 and 1508 may be performed in conjunction with one another. For example, before establishing the call, a determination may be made as to whether to allocate only the first RF chain to the call or allocate both the first and diversity RF chains to the call.

The determination of block 1508 may take various forms in different implementations. In some aspects, the determination of block 1508 may involve allocating the diversity RF chain to the call if the paging messages for the second subscription are not received during any timeslot used by the call. In some aspects, the determination of block 1508 may involve forgoing allocation of the diversity RF chain to the call if the paging messages for the second subscription are received during any timeslot used by the call and if the channel condition associated with the reception of the paging messages is greater than or equal to the threshold. In some aspects, the determination of block 1508 may involve allocating the diversity RF chain to the call if a channel condition associated with the reception of the paging messages is less than or equal to the threshold. In some aspects, the determination of block 1508 may involve allocating the diversity RF chain to the call if the second subscription and the call are assigned to the same RF channel and timeslot. In some aspects, the determination of block 1508 may involve allocating the diversity RF chain to the call if the second subscription is assigned to an RF channel and timeslot that are not assigned to more than one call. In some aspects, the determination of block 1508 may involve dynamically allocating the diversity RF chain between the call that uses the first subscription and the second call if the second call and the call that uses the first subscription are assigned different RF channels and timeslots.

Figure 16:
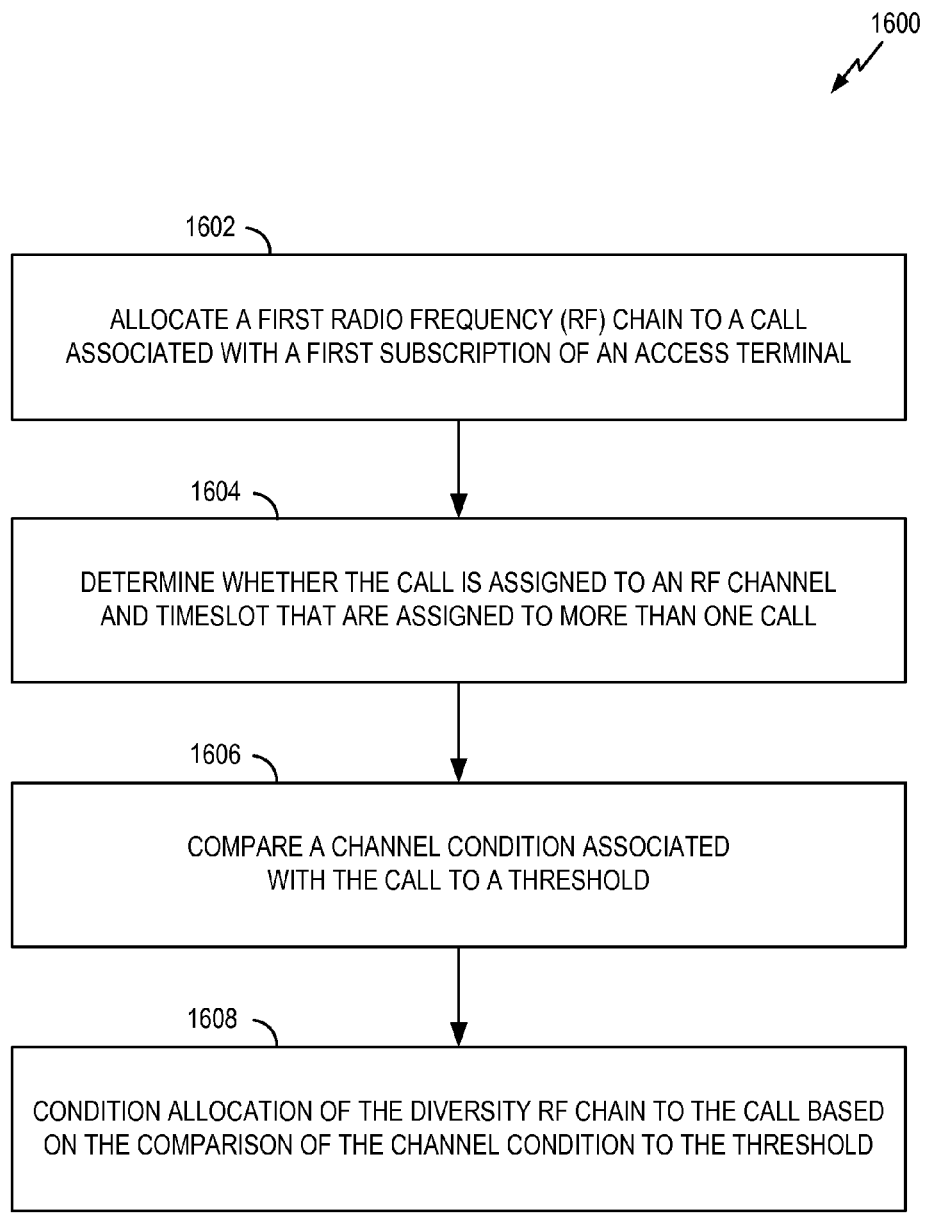
FIG. 16 is a flowchart illustrating additional aspects of a process for conditionally allocating an RF chain according to some aspects of the disclosure.

FIG. 16 illustrates a process 1600 relating to additional aspects of providing receive diversity in accordance with some aspects of the disclosure. The process 1600 may take place within a processing circuit 1410 (FIG. 14), which may be located at a UE or some other suitable apparatus. In another aspect, the process 1600 may be implemented by any of the UEs 130-140 illustrated in FIG. 1. Of course, in various aspects within the scope of the present disclosure, the process 1600 may be implemented by any suitable apparatus capable of supporting diversity operations.

At block 1602, a first RF chain is allocated to a call associated with a first subscription of an access terminal. These operations correspond to the operations of block 1502.

At block 1604, a determination is made as to whether the call established at block 1502 is assigned to an RF channel and timeslot that are assigned to more than one call. These operations correspond to the operations of block 1504.

At block 1606, a channel condition associated with the call is compared to a threshold. For example, the channel condition of a VAMOS channel may correspond to at least one of: a received signal strength indication or a signal-to-interference-and-noise ratio.

At block 1608, allocation of the diversity RF chain is conditioned on the comparison of block 1606. In some aspects, the determination of block 1508 may involve allocating the diversity RF chain to the call if a channel condition associated with the call is less than or equal to the threshold. In some aspects, the determination of block 1508 may involve forgoing allocation of the diversity RF chain to the call if the channel condition is greater than or equal to the threshold.

Figure 17:
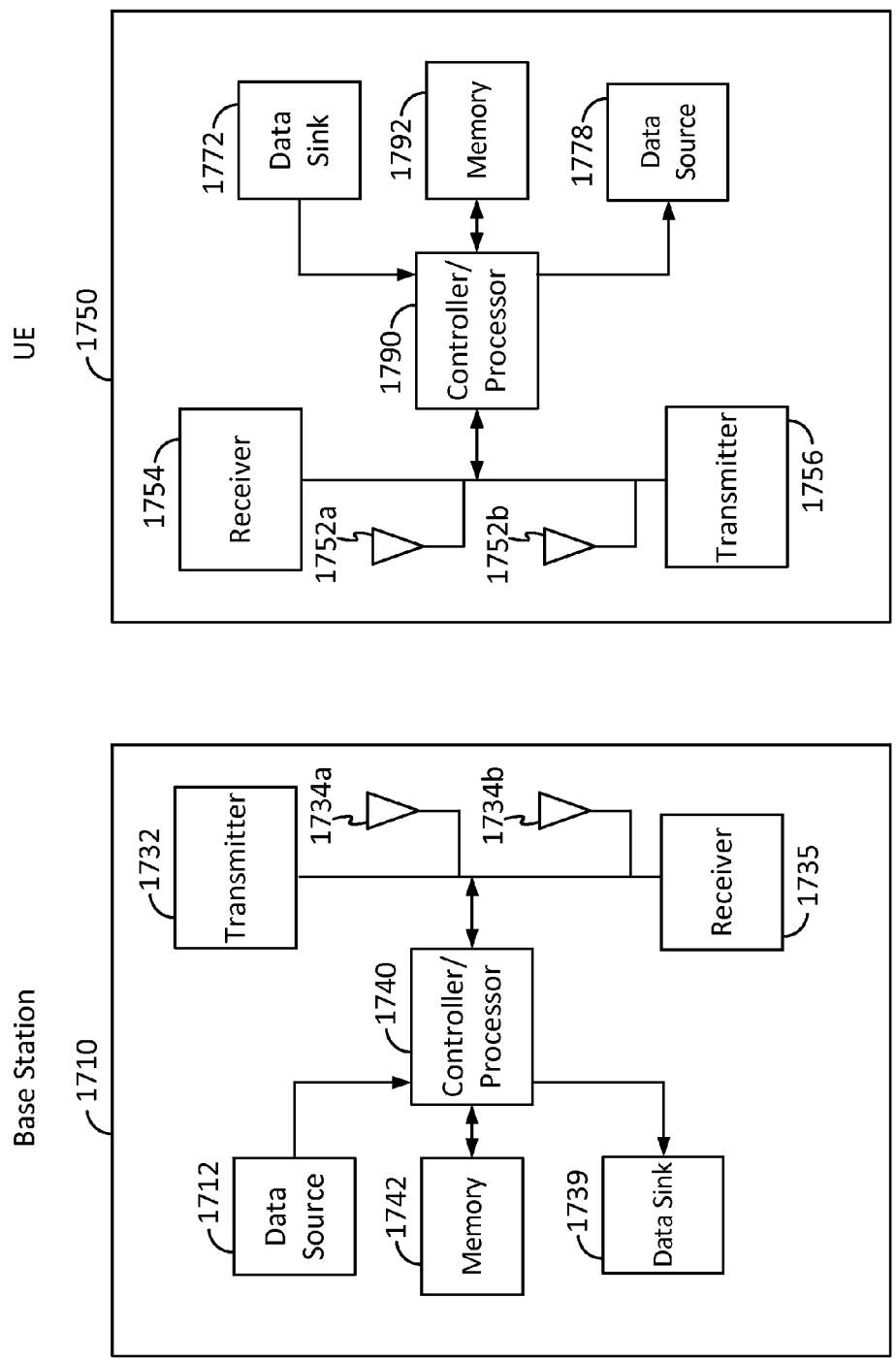
FIG. 17 is a block diagram conceptually illustrating an example of a base station in communication with a UE in a communication system.

FIG. 17 is a block diagram of a base station 1710 in communication with a UE 1750, where the base station 1710 may be the BTS 208 in FIG. 2, and the UE 1750 may be the UE 210 in FIG. 2. In the downlink communication, a controller or processor 1740 may receive data from a data source 1712. Channel estimates may be used by a controller/processor 1740 to determine the coding, modulation, spreading, and/or scrambling schemes for the transmit processor 1720. These channel estimates may be derived from a reference signal transmitted by the UE 1750 or from feedback from the UE 1750. A transmitter 1732 may provide various signal conditioning functions including amplifying, filtering, and modulating frames onto a carrier for downlink transmission over a wireless medium through one or more antennas 1734. The antennas 1734 may include one or more antennas, for example, including beam steering bidirectional adaptive antenna arrays, MIMO arrays, or any other suitable transmission/reception technologies.

At the UE 1750, a receiver 1754 receives the downlink transmission through one or more antennas 1752 and processes the transmission to recover the information modulated onto the carrier. The information recovered by the receiver 1754 is provided to a controller/processor 1790. The processor 1790 descrambles and despreads the symbols, and determines the most likely signal constellation points transmitted by the base station 1710 based on the modulation scheme. These soft decisions may be based on channel estimates computed by the processor 1790. The soft decisions are then decoded and deinterleaved to recover the data, control, and reference signals. The CRC codes are then checked to determine whether the frames were successfully decoded. The data carried by the successfully decoded frames will then be provided to a data sink 1772, which represents applications running in the UE 1750 and/or various user interfaces (e.g., display). Control signals carried by successfully decoded frames will be provided to a controller/processor 1790. When frames are unsuccessfully decoded, the controller/processor 1790 may also use an acknowledgement (ACK) and/or negative acknowledgement (NACK) protocol to support retransmission requests for those frames.

In the uplink, data from a data source 1778 and control signals from the controller/processor 1790 are provided. The data source 1778 may represent applications running in the UE 1750 and various user interfaces (e.g., keyboard). Similar to the functionality described in connection with the downlink transmission by the base station 1710, the processor 1790 provides various signal processing functions including CRC codes, coding and interleaving to facilitate FEC, mapping to signal constellations, spreading with OVSFs, and scrambling to produce a series of symbols. Channel estimates, derived by the processor 1790 from a reference signal transmitted by the base station 1710 or from feedback contained in a midamble transmitted by the base station 1710, may be used to select the appropriate coding, modulation, spreading, and/or scrambling schemes. The symbols produced by the processor 1790 will be utilized to create a frame structure. The processor 1790 creates this frame structure by multiplexing the symbols with additional information, resulting in a series of frames. The frames are then provided to a transmitter 1756, which provides various signal conditioning functions including amplification, filtering, and modulating the frames onto a carrier for uplink transmission over the wireless medium through the one or more antennas 1752.

The uplink transmission is processed at the base station 1710 in a manner similar to that described in connection with the receiver function at the UE 1750. A receiver 1735 receives the uplink transmission through the one or more antennas 1734 and processes the transmission to recover the information modulated onto the carrier. The information recovered by the receiver 1735 is provided to the processor 1740, which parses each frame. The processor 1740 performs the inverse of the processing performed by the processor 1790 in the UE 1750. The data and control signals carried by the successfully decoded frames may then be provided to a data sink 1739. If some of the frames were unsuccessfully decoded by the receive processor, the controller/processor 1740 may also use an acknowledgement (ACK) and/or negative acknowledgement (NACK) protocol to support retransmission requests for those frames.

The controller/processors 1740 and 1790 may be used to direct the operation at the base station 1710 and the UE 1750, respectively. For example, the controller/processors 1740 and 1790 may provide various functions including timing, peripheral interfaces, voltage regulation, power management, and other control functions. The computer readable media of memories 1742 and 1792 may store data and software for the base station 1710 and the UE 1750, respectively.

Conclusion

Several aspects of a telecommunications system have been presented with reference to a GSM/EDGE Radio Access Network (GERAN) system. As those skilled in the art will readily appreciate, various aspects described throughout this disclosure may be extended to other telecommunication systems, network architectures and communication standards. For example, the concepts disclosed can be applied to any time-division-based system, such as but not limited to a UMTS system using a TDD air interface, or an e-UTRA system using a TD-LTE air interface. Especially in the multi-SIM (e.g., dual-SIM) examples, the subscriptions might be on any of these types of systems.

By way of further example, various aspects may be extended to other systems such as TD-SCDMA, TD-CDMA, and W-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While the above discussed aspects, arrangements, and embodiments are discussed with specific details and particularity, one or more of the components, operations, features and/or functions illustrated in one or more of FIG. 9-13, 15, or 16 may be rearranged and/or combined into a single component, operation, feature or function or embodied in several components, operations, or functions. Additional elements, components, operations, and/or functions may also be added or not utilized without departing from the teachings herein. The apparatus, devices and/or components illustrated in one or more of FIG. 1, 2, 5, 8, 14, or 17 may be configured to perform or employ one or more of the methods, features, parameters, or operations described in one or more of FIG. 9-13, 15, or 16. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm operations described in connection with the embodiments disclosed herein may be implemented as hardware, software, firmware, middleware, microcode, or any combination thereof. To clearly illustrate this interchangeability, various illustrative components, blocks, modules, circuits, and operations have been described above generally in terms of their functionality. Whether such functionality is implemented as hardware or software depends upon the particular application and design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication, comprising:
    allocating a first radio frequency (RF) chain to a call associated with a first subscription of an access terminal;
    determining whether the call is assigned to an RF channel and timeslot that are assigned to more than one call;
    identifying an operational condition associated with a second subscription of the access terminal; and
    determining whether to allocate a diversity RF chain to the call in addition to the first RF chain, wherein the determination of whether to allocate the diversity RF chain is based on the determination of the call assignment and the identified operational condition.

2. The method of claim 1, wherein the determination of whether the call is assigned to an RF channel and timeslot that are assigned to more than one call comprises:
    determining whether the call is a global system for mobile communications (GSM) voice service over adaptive multi-user channel on one slot (VAMOS) call.

3. The method of claim 1, further comprising:
    comparing a channel condition associated with the call to a threshold; and
    forgoing allocation of the diversity RF chain to the call if the channel condition is greater than or equal to the threshold.

4. The method of claim 3, wherein the channel condition corresponds to at least one of: a received signal strength indication or a signal-to-interference-and-noise ratio.

5. The method of claim 1, wherein:
    the operational condition relates to whether paging messages for the second subscription are received during any timeslot used by the call; and
    the method further comprises allocating the diversity RF chain to the call if the paging messages for the second subscription are not received during any timeslot used by the call.

6. The method of claim 1, wherein:
    the operational condition relates to whether paging messages for the second subscription are received during any timeslot used by the call and to comparison of a channel condition associated with the reception of the paging messages to a threshold; and
    the method further comprises forgoing allocation of the diversity RF chain to the call if the paging messages for the second subscription are received during any timeslot used by the call and if the channel condition associated with the reception of the paging messages is greater than or equal to the threshold.

7. The method of claim 1, wherein:
    the operational condition relates to comparison of a channel condition associated with reception of paging messages for the second subscription to a threshold; and
    the method further comprises allocating the diversity RF chain to the call if the channel condition associated with the reception of the paging messages is less than or equal to the threshold.

8. The method of claim 1, wherein:
    the operational condition relates to whether the second subscription is assigned to the same RF channel and timeslot that are assigned to the call; and
    the method further comprises allocating the diversity RF chain to the call if the second subscription and the call are assigned to the same RF channel and timeslot.

9. The method of claim 8, further comprising:
    comparing a channel condition associated with the call to a threshold; and
    allocating the diversity RF chain to the call if the channel condition is less than or equal to the threshold.

10. The method of claim 1, wherein:
    the operational condition relates to whether the second subscription is assigned to an RF channel and timeslot that are not assigned to more than one call; and
    the method further comprises allocating the diversity RF chain to the call if the second subscription is assigned to an RF channel and timeslot that are not assigned to more than one call.

11. The method of claim 1, wherein:
    the operational condition relates to whether a second call using the second subscription is assigned to a second RF channel and a second timeslot that are assigned to more than one call, where the second RF channel and the second timeslot assigned to the second call are different from the RF channel and the timeslot assigned to the call that uses the first subscription; and
    the method further comprises dynamically allocating the diversity RF chain between the call that uses the first subscription and the second call if the second call and the call that uses the first subscription are assigned different RF channels and timeslots.

12. The method of claim 1, wherein:
the first subscription is associated with a first subscriber identity module of the access terminal; and
the second subscription is associated with a second subscriber identity module of the access terminal.

13. The method of claim 1, wherein each RF chain comprises at least one of: an antenna or a receiver circuit.

14. An apparatus configured for wireless communication, comprising:
at least one processing circuit;
a memory coupled to the at least one processing circuit; and
a communication interface, comprising a first radio frequency (RF) chain and a diversity RF chain, coupled to the at least one processing circuit,
wherein the at least one processing circuit is configured to:
allocate the first RF chain to a call associated with a first subscription of the apparatus;
determine whether the call is assigned to an RF channel and timeslot that are assigned to more than one call;
identify an operational condition associated with a second subscription of the access terminal; and
determine whether to allocate a diversity RF chain to the call in addition to the first RF chain, wherein the determination of whether to allocate the diversity RF chain is based on the determination of the call assignment and the identified operational condition.

15. The apparatus of claim 14, wherein the determination of whether the call is assigned to an RF channel and timeslot that are assigned to more than one call comprises:
determining whether the call is a global system for mobile communications (GSM) voice service over adaptive multi-user channel on one slot (VAMOS) call.

16. The apparatus of claim 14, wherein the at least one processing circuit is further configured to:
compare a channel condition associated with the call to a threshold; and
forgo allocation of the diversity RF chain to the call if the channel condition is greater than or equal to the threshold.

17. The apparatus of claim 16, wherein the channel condition corresponds to at least one of: a received signal strength indication or a signal-to-interference-and-noise ratio.

18. The apparatus of claim 14, wherein:
the operational condition relates to whether paging messages for the second subscription are received during any timeslot used by the call; and
the at least one processing circuit is further configured to allocate the diversity RF chain to the call if the paging messages for the second subscription are not received during any timeslot used by the call.

19. The apparatus of claim 14, wherein:
the operational condition relates to whether paging messages for the second subscription are received during any timeslot used by the call and to comparison of a channel condition associated with the reception of the paging messages to a threshold; and
the at least one processing circuit is further configured to forgo allocation of the diversity RF chain to the call if the paging messages for the second subscription are received during any timeslot used by the call and if the channel condition associated with the reception of the paging messages is greater than or equal to the threshold.

20. The apparatus of claim 14, wherein:
the operational condition relates to comparison of a channel condition associated with reception of paging messages for the second subscription to a threshold; and
the at least one processing circuit is further configured to allocate the diversity RF chain to the call if the channel condition associated with the reception of the paging messages is less than or equal to the threshold.

21. The apparatus of claim 14, wherein:
the operational condition relates to whether the second subscription is assigned to the same RF channel and timeslot that are assigned to the call; and
the at least one processing circuit is further configured to allocate the diversity RF chain to the call if the second subscription and the call are assigned to the same RF channel and timeslot.

22. The apparatus of claim 21, wherein the at least one processing circuit is further configured to:
compare a channel condition associated with the call to a threshold; and
allocate the diversity RF chain to the call if the channel condition is less than or equal to the threshold.

23. The apparatus of claim 14, wherein:
the operational condition relates to whether the second subscription is assigned to an RF channel and timeslot that are not assigned to more than one call; and
the at least one processing circuit is further configured to allocate the diversity RF chain to the call if the second subscription is assigned to an RF channel and timeslot that are not assigned to more than one call.

24. The apparatus of claim 14, wherein:
the operational condition relates to whether a second call using the second subscription is assigned to a second RF channel and a second timeslot that are assigned to more than one call, where the second RF channel and the second timeslot assigned to the second call are different from the RF channel and the timeslot assigned to the call that uses the first subscription; and
the at least one processing circuit is further configured to dynamically allocate the diversity RF chain between the call that uses the first subscription and the second call if the second call and the call that uses the first subscription are assigned different RF channels and timeslots.

25. The apparatus of claim 14, wherein:
the first subscription is associated with a first subscriber identity module of the apparatus; and
the second subscription is associated with a second subscriber identity module of the apparatus.

26. The apparatus of claim 14, wherein each RF chain comprises at least one of: an antenna or a receiver circuit.

27. An apparatus configured for wireless communication, comprising:
means for allocating a first radio frequency (RF) chain to a call associated with a first subscription of the apparatus;
means for determining whether the call is assigned to an RF channel and timeslot that are assigned to more than one call;
means for identifying an operational condition associated with a second subscription of the apparatus; and
means for determining whether to allocate a diversity RF chain to the call in addition to the first RF chain, wherein the determination of whether to allocate the diversity RF chain is based on the determination of the call assignment and the identified operational condition.

28. The apparatus of claim 27, wherein the determination of whether the call is assigned to an RF channel and timeslot that are assigned to more than one call comprises:
determining whether the call is a global system for mobile communications (GSM) voice service over adaptive multi-user channel on one slot (VAMOS) call.

29. An article of manufacture including a non-transitory computer-readable medium having programming for causing a computer to:
- allocate a first radio frequency (RF) chain to a call associated with a first subscription of an access terminal;
- determine whether the call is assigned to an RF channel and timeslot that are assigned to more than one call;
- identify an operational condition associated with a second subscription of the access terminal; and
- determine whether to allocate a diversity RF chain to the call in addition to the first RF chain, wherein the determination of whether to allocate the diversity RF chain is based on the determination of the call assignment and the identified operational condition.

30. The article of manufacture of claim 29, wherein the determination of whether the call is assigned to an RF channel and timeslot that are assigned to more than one call comprises:
- determining whether the call is a global system for mobile communications (GSM) voice service over adaptive multi-user channel on one slot (VAMOS) call.

\* \* \* \* \*